United States Patent
Kato

(10) Patent No.: US 8,237,818 B2
(45) Date of Patent: Aug. 7, 2012

(54) CAMERA

(75) Inventor: Minoru Kato, Utsunomiya (JP)

(73) Assignee: Nikon Corporation, Tokyo (JP)

( * ) Notice: Subject to any disclaimer, the term of this patent is extended or adjusted under 35 U.S.C. 154(b) by 413 days.

(21) Appl. No.: 12/458,459

(22) Filed: Jul. 13, 2009

(65) Prior Publication Data

US 2009/0278959 A1    Nov. 12, 2009

Related U.S. Application Data

(63) Continuation of application No. PCT/JP2008/000360, filed on Feb. 27, 2008.

(30) Foreign Application Priority Data

Mar. 2, 2007 (JP) .................................. 2007-053131

(51) Int. Cl.
- H04N 2/262 (2006.01)
- H04N 5/76 (2006.01)
- H04N 5/222 (2006.01)
- G03B 17/24 (2006.01)

(52) U.S. Cl. ................. 348/239; 348/231.3; 348/333.02; 396/313

(58) Field of Classification Search ............... 348/231.3, 348/239, 333.02; 396/313
See application file for complete search history.

(56) References Cited

U.S. PATENT DOCUMENTS

| | | | |
|---|---|---|---|
| 6,038,406 A * | 3/2000 | Xie et al. ...................... | 396/313 |
| 6,175,663 B1 * | 1/2001 | Huang .......................... | 382/284 |
| 6,188,432 B1 * | 2/2001 | Ejima ....................... | 348/240.99 |
| 7,440,013 B2 * | 10/2008 | Funakura ...................... | 348/239 |
| 7,936,382 B2 * | 5/2011 | Kim ................................ | 348/239 |
| 2002/0081112 A1 * | 6/2002 | Morohashi et al. ........... | 396/312 |
| 2004/0135906 A1 * | 7/2004 | Okada ........................... | 348/239 |
| 2005/0078221 A1 * | 4/2005 | Kobayashi .................... | 348/600 |
| 2005/0097463 A1 * | 5/2005 | Yu ................................ | 715/531 |
| 2005/0117044 A1 * | 6/2005 | Suto ........................ | 348/333.12 |
| 2006/0001758 A1 * | 1/2006 | Nam et al. ................ | 348/333.12 |
| 2006/0114336 A1 * | 6/2006 | Liu ............................. | 348/231.3 |

(Continued)

FOREIGN PATENT DOCUMENTS

JP         A-3-33795         2/1991

(Continued)

OTHER PUBLICATIONS

Japanese Office Action issued in Application No. 2007-053131; Dated Aug. 2, 2011 (With Translation).

(Continued)

*Primary Examiner* — John Villecco
*Assistant Examiner* — Selam Gebriel
(74) *Attorney, Agent, or Firm* — Oliff & Berridge, PLC

(57) ABSTRACT

A camera includes an imaging unit that generates image data, an inserting-image setting unit that sets an inserting image to be inserted into an image of the image data, a first detecting unit that detects a main subject area in a subject image, a second detecting unit that detects a background area in the subject image based on the main subject area, an inserting-area selecting unit that selects an inserting area into which an inserting image is inserted from the background area, and a magnification determining unit that determines a magnification for enlargement or reduction of the inserting image in accordance with a size of the inserting area and a size of the inserting image, and thereby inserts an inserting image of an appropriate size.

17 Claims, 29 Drawing Sheets

U.S. PATENT DOCUMENTS

| | | | |
|---|---|---|---|
| 2007/0035640 A1* | 2/2007 | Misawa | 348/239 |
| 2007/0177036 A1* | 8/2007 | Kawada | 348/239 |

FOREIGN PATENT DOCUMENTS

| | | |
|---|---|---|
| JP | A-08-044883 | 2/1996 |
| JP | A-10-26967 | 1/1998 |
| JP | A-11-219439 | 8/1999 |
| JP | A-2001-008064 | 1/2001 |
| JP | A-2002-010066 | 1/2002 |
| JP | A-2002-158861 | 5/2002 |
| JP | A-2002-171436 | 6/2002 |
| JP | A-2003-111009 | 4/2003 |
| JP | A-2003-208569 | 7/2003 |
| JP | A-2003-348410 | 12/2003 |
| JP | A-2004-302939 | 10/2004 |
| JP | A-2005-124134 | 5/2005 |
| JP | A-2005-277476 | 10/2005 |
| JP | A-2005-354461 | 12/2005 |
| JP | A-2006-033370 | 2/2006 |
| JP | A-2006-172118 | 6/2006 |
| JP | A-2006-277227 | 10/2006 |

OTHER PUBLICATIONS

Dec. 27, 2011 Office Action issued in Japanese Patent Application No. 2007-053131 (with translation).

* cited by examiner

FIG.19B

FROM TOP TO BOTTOM

FROM RIGHT TO LEFT

CAMERA

CROSS-REFERENCE TO RELATED APPLICATION

This application is a continuation application of International Application No. PCT/JP2008/000360, filed Feb. 27, 2008, designating the U.S., and claims the benefit of priority from Japanese Patent Application No. 2007-053131, filed on Mar. 2, 2007, the entire contents of which are incorporated herein by reference.

BACKGROUND

1. Field

The present application relates to a camera that inserts an inserting image into image data.

2. Description of the Related Art

A technique to insert an inserting image, such as date, into image data generated by a camera etc. is devised. With such a technique, there is a problem that an inserting image overlaps a main subject. To solve this problem, in the invention disclosed in Patent Document 1, an inserting image is inserted into a position so as not to overlap the face of a person, who is the main subject, by performing image recognition.

Patent Document 1 Japanese Unexamined Patent Application Publication No. 2006-172118

However, as to the invention disclosed in Patent Document 1, there is a case where it is not possible to insert an inserting image into a position that does not overlap a main subject when the inserting image is large. In this case, there is a possibility that the inserting image overlaps the main subject.

SUMMARY

A proposition of the present application has been made in view of the above-mentioned problem and is to provide a camera capable of inserting an inserting image of an appropriate size in accordance with a size of an inserting image and a size of an inserting area into which the inserting image is inserted.

In order to achieve the proposition, the camera of the present application includes an imaging unit that captures a subject image to generate image data, an inserting-image setting unit that sets an inserting image to be inserted into an image of the image data, a first detecting unit that detects a main subject area in the subject image, a second detecting unit that detects a background area in the subject image based on the main subject area, an inserting-area selecting unit that selects an inserting area into which the inserting image is inserted from the background area, and a magnification determining unit that determines a magnification for enlargement or reduction of the inserting image in accordance with a size of the inserting area and a size of the inserting image.

The camera may further include a size changing unit that enlarges or reduces the inserting image in accordance with the magnification determined by the magnification determining unit and an inserting unit that inserts the inserting image enlarged or reduced by the size changing unit into the inserting area.

The camera may further include a recording unit that records the image data generated by the imaging unit, image data of the inserting image, the information indicative of the inserting area, and the magnification determined by the magnification determining unit in associating with one another into a recording medium.

The camera may further include a displaying unit of touch panel type, wherein the inserting-image setting unit may include an obtaining unit that obtains handwritten image information based on a user operation via the displaying unit or text information obtained by performing character recognition processing on the handwritten image information as the inserting image.

The inserting-image setting unit may include an extracting unit that extracts an area of the inserting image obtained by the obtaining unit.

The camera may further include a display controlling unit that displays a confirmation image for confirming the area of the inserting image extracted by the extracting unit on the displaying unit and a receiving unit for changing of area that receives a user instruction to couple or cut the area of the inserting image, wherein the inserting-image setting unit may set the inserting image based on the user instruction received by the receiving unit for changing of area.

The camera may further include a display controlling unit that displays a confirmation image for confirming the area of the inserting image extracted by the extracting unit on the displaying unit and a receiving unit for associating area that receives, when the inserting image includes a plurality of areas, a user instruction to associate at least two areas among the plurality of the areas, wherein the inserting-image setting unit may set the inserting image based on the user instruction received by the receiving unit for associating area.

The inserting-image setting unit may include a determining unit that determines, when character information is included in a plurality of areas associated with one another by a user instruction, whether the character information is written vertically or horizontally and a layout setting unit that sets a layout of the plurality of the areas in accordance with a determination result by the determining unit.

The camera may further include a priorities decision unit that sets, when there is a plurality of inserting images to be set by the inserting-image setting unit, priorities to the plurality of the inserting images, wherein the inserting-image selecting unit may select a plurality of inserting areas into which the plurality of the inserting images are inserted respectively in a descending order of priorities and the magnification determining unit may determine each magnification in accordance with each size of the plurality of the inserting areas selected by the inserting-area selecting unit and each size of the plurality of the inserting images to be inserted into the plurality of the inserting areas respectively in the descending order of priorities.

The priorities decision unit may set the priorities based on at least one of each size of the plurality of the inserting images, an input order of the plurality of the inserting images by a user, and an instruction of a priority order by a user.

The camera may further include an inserting-area setting unit, wherein when there is a plurality of inserting-area candidates which are candidates of the inserting area, the magnification determining unit may determine each magnification for enlargement or reduction of the inserting image for each of the plurality of the inserting-area candidates and the inserting-area setting unit may set an inserting-area candidate which corresponds to a highest magnification determined by the magnification determining unit from among the plurality of the inserting-area candidates, as an inserting area into which the inserting image is inserted.

The inserting-area selecting unit may determine whether or not there is a plurality of the inserting-area candidates and select inserting-area candidates which meet specific conditions as second inserting-area candidates based on shapes of the plurality of the inserting-area candidates when determining that there is the plurality of the inserting-area candidates, and wherein the magnification determining unit may determine each magnification for enlargement or reduction of the inserting image for each of the second inserting-area candidates.

The inserting-area setting unit may set the inserting area by taking into consideration whether or not the size of the inserting image being enlarged or reduced is less than a threshold value.

The inserting-area selecting unit may divide the background area into a plurality of blocks and determine whether a plurality of areas each including successive blocks in which a difference in color distribution and a difference in luminance distribution are each within a predetermined threshold value exist or not, and select the plurality of the successive blocks as the plurality of the inserting-area candidates when determining that the plurality of the areas exist.

The inserting-area selecting unit may select the inserting area from all of the background area regardless of the successive blocks when the size of the inserting image being enlarged or reduced is less than a threshold value in all of the plurality of the inserting-area candidates.

The first detecting unit may detect the main subject area based on at least one of a face recognition technique and information about an AF area.

The inserting-area selecting unit may divide the background area into a plurality of blocks and select, as the inserting area, an area including successive blocks in which a difference in color distribution and a difference in luminance distribution are each within a threshold value.

The camera may further include a displaying unit that displays a confirmation image for confirming an insertion result of the inserting image inserted by the inserting unit and a receiving unit for editing of inserting-image that receives at least one of a user instruction to change a position of the inserting image, a user instruction to change a magnification of enlargement or reduction by the size changing unit, and a user instruction to rotate the inserting image.

In addition, those which represent the configuration relating to the present application by transforming it into image processing programs that realize image processing of image data to be processed are also effective as a specific aspect of the present application.

BRIEF DESCRIPTION OF THE DRAWINGS

FIG. 19B is a diagram for illustrating an operation that utilizes an edit screen.

DETAILED DESCRIPTION OF THE EMBODIMENTS

First Embodiment

Hereinafter, a description is given of a first embodiment with reference to the drawings. In the first embodiment, an electronic camera is taken as an example in the description.

Figure 1:
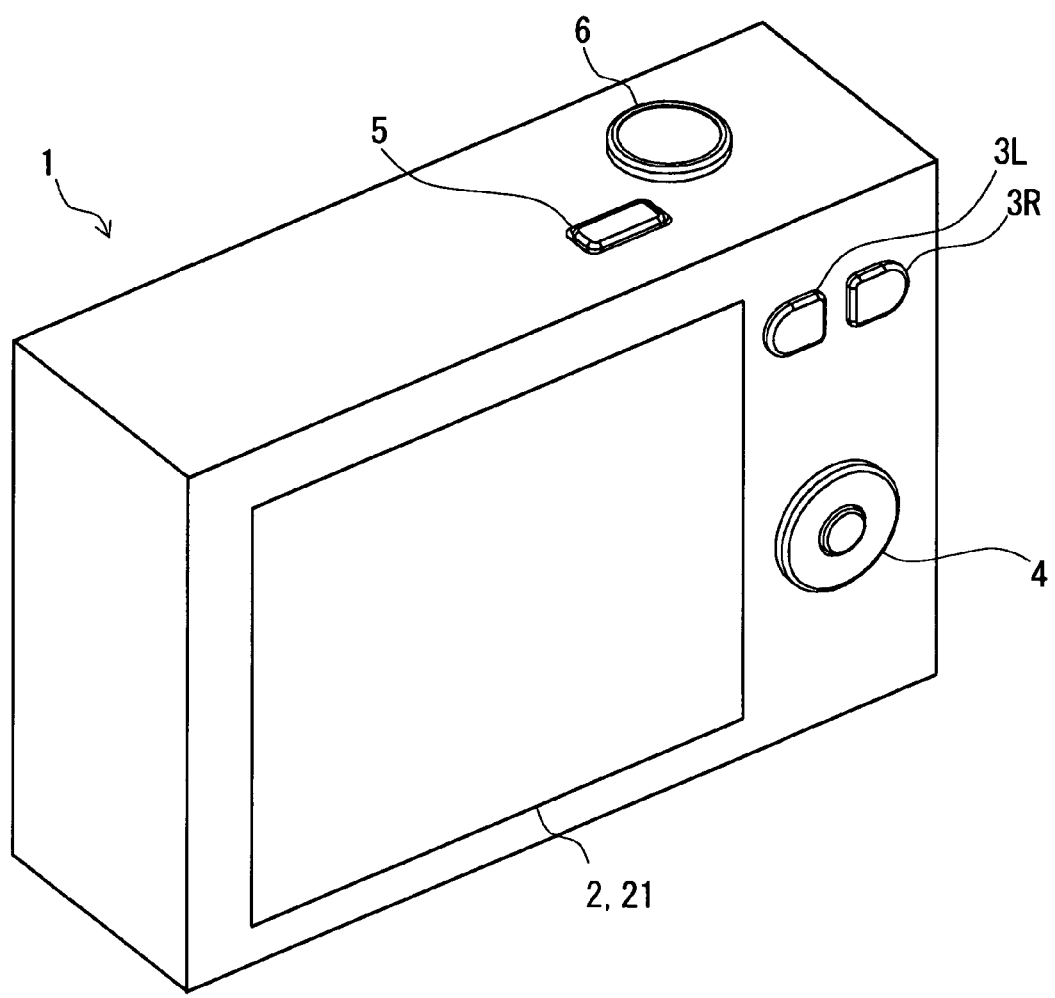
FIG. 1 is an external appearance view of an electronic camera 1 in a first embodiment.

As shown in an external appearance diagram in FIG. 1, an electronic camera 1 includes an image displaying part 2, zoom buttons 3L and 3R, and a cross button 4 on its rear surface. The electronic camera 1 also includes a power button 5 and a release button 6 on its top surface. The image displaying part 2 is a displaying part that includes a touch panel 21, to be described later. It is possible for a user to perform various input operations by touching the touch panel 21 using a pen etc.

Figure 2:
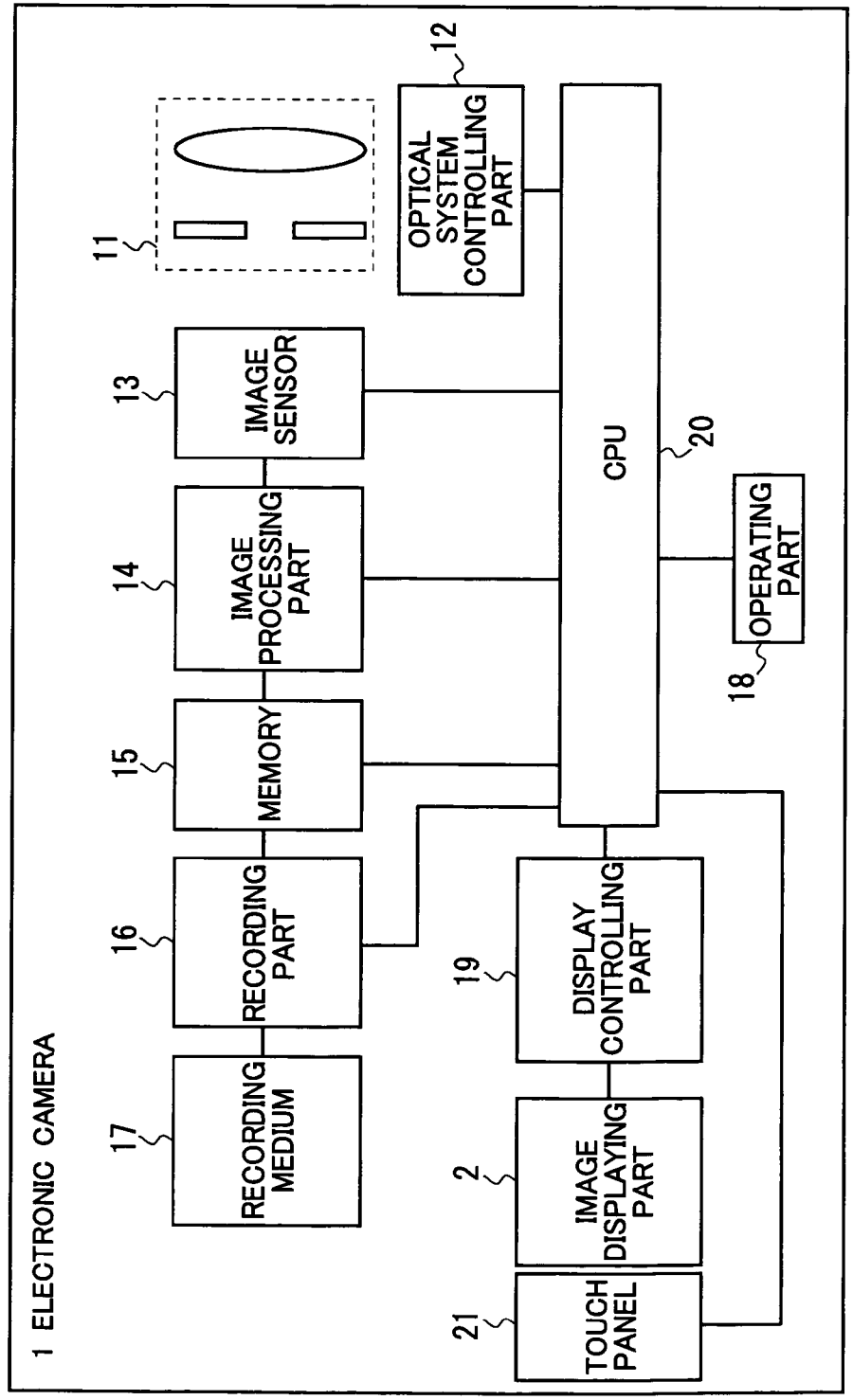
FIG. 2 is a block diagram of the electronic camera 1 in the first embodiment.

FIG. 2 is a block diagram showing a configuration of the electronic camera 1 in the first embodiment. As shown in FIG. 2, the electronic camera 1 includes an optical system 11, an optical system controlling part 12, an image sensor 13, an image processing part 14, a memory 15, a recording part 16, a recording medium 17, an operating part 18, a display controlling part 19, a CPU 20, and the touch panel 21. The optical system 11 includes a lens, an aperture, etc. The optical system 11 can be interchanged with another. The optical system controlling part 12 controls the aperture and the focus position of the lens. The image sensor 13 transforms a subject image formed via the optical system 11 into image data and outputs it to the image processing part 14. The image processing part 14 performs digital signal processing in various manners, such as color signal generation, matrix transformation processing, γ transformation processing, correction processing, and image processing to insert an inserting image, to be described later. The description of a specific method of each image processing is omitted. The memory 15 temporarily records image data after image processing by the image processing part 14. The recording part 16 records the image data temporarily recorded in the memory 15 in the recording medium 17. The recording medium 17 is a removable memory, such as a memory card. The operating part 18 includes the cross button 4, the power button 5, the release button 6, etc. The display controlling part 19 controls the display content on the image displaying part 2. The CPU 20 controls each part integrally. The CPU 20 also detects whether or not the operating part 18 is operated by a user and whether or not the touch panel 21 is operated by a user. Further, the CPU 20 determines an inserting area of an inserting image. Details of the determination will be described later. Furthermore, the CPU 20 records in advance programs used to execute each processing.

The touch panel 21 is an input device with which a user inputs a handwritten character etc. The touch panel 21 is attached onto the top surface of the image displaying part 2. The touch panel 21 detects a position of the touch panel 21 pressed by a user and outputs an input signal in accordance with the pressed position to the CPU 20. Since the touch panel 21 installed on the image displaying part 21 is transparent, it is unlikely that the display on the image displaying part 2 is obstructed by the installed touch panel 21. The touch panel 21 has fine input areas partitioned into the shape of a grid on the display range and when a user presses down the touch panel 21 with his/her finger or a touch pen, the input area in the pressed position turns on. The touch panel 21 outputs information, for example, coordinate values, specifying the position on the touch panel 21 in which the input area has turned on to the CPU 20 as an operation signal of the touch panel 21.

The electronic camera 1 has a function to insert an inserting image into image data generated by capturing the image. Inserting images include three kinds of image. The first one is an inserting image based on handwritten image information (hereinafter, referred to as "handwritten information") to be input by a user via the touch panel 21. The second one is an inserting image obtained by subjecting the handwritten information input by a user via the touch panel 21 to character recognition processing. The third one is information, such as a text message, symbol, and diagram (hereinafter, referred to as "stamp information"). The electronic camera 1 records in advance a plurality of pieces of stamp information in a built-in flash memory.

It may also be possible to further use information about shooting, such as information about shooting conditions (exposure value, shutter speed, etc.) at the time of shooting and shooting date, and positional information, as an inserting image. Furthermore, it may also be possible to use positional information obtained by GPS (Global Positioning Systems) as an inserting image.

The operation of the CPU 20 when inserting an inserting image in the electronic camera 1 will be described using flowcharts in FIG. 3 to FIG. 12. The execution of processing to insert an inserting image is started by the operation of the operating part 18 or the touch panel 21 by a user.

Step S1: The CPU 20 determines a target image into which an inserting image is inserted. The target image into which an inserting image is inserted is an image generated by the image sensor 13 or an image recorded in the recording medium 17.

First, the insertion of an inserting image into an image generated by the image sensor 13 will be described. When the release button 6 is operated by a user, the CPU 20 captures a subject image and generates an image by controlling each part and temporarily records image data of the generated image in the memory 15. On the other hand, when an inserting image is inserted into an image recorded in the recording medium 17, the CPU 20 prompts the user to specify an image through the operating part 18 or the touch panel 21 by a display on the image displaying part 2 etc. Then, after a target image into which an inserting image is inserted is specified by the user, the CPU 20 reads image data of the corresponding image from the recording medium 17 and temporarily records the image data in the memory 15.

Step S2: The CPU 20 detects a main subject area in the image determined in step S1. The CPU 20 detects a main subject area in a manner similar to that of the publicly known technique. For example, when detecting by face recognition processing, the CPU 20 first performs color space transformation and then detects a skin color area. Then, the CPU 20 detects the face area by determining whether or not there are eyes in the detected skin color area. Further, the CPU 20 detects the main subject area by detecting the body part of a person that is continuous with the face area. The CPU 20 detects an area under the face area of the person and with a width about three times the width of the face as an area of the body part of the person. It is possible for the CPU 20 to determine whether an image is normal or upside down based on the output of a posture detection sensor of the camera.

Any technique may be used to detect a main subject area. For example, it may also be possible to detect a main subject area using AF area information. AF area information is information indicating which area of the subject is searched for the focal point of the optical system 11. The AF area is determined by the CPU 20 based on the operation at the operating part 18. In addition, it may also be possible to use the information of the detected subject area for the AE/AF control.

Figure 13A:
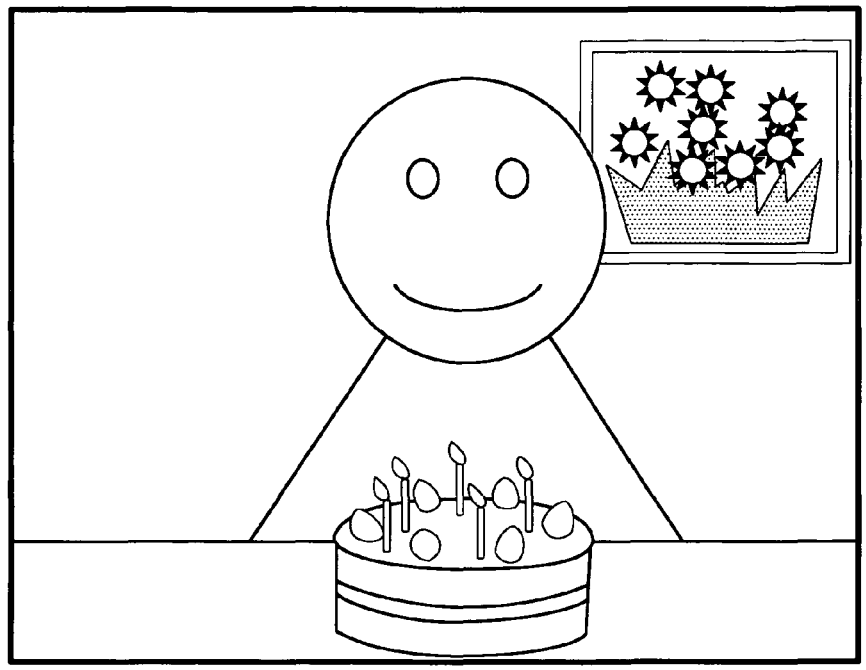
FIG. 13A is an example of an image determined in step S1.
Figure 13B:
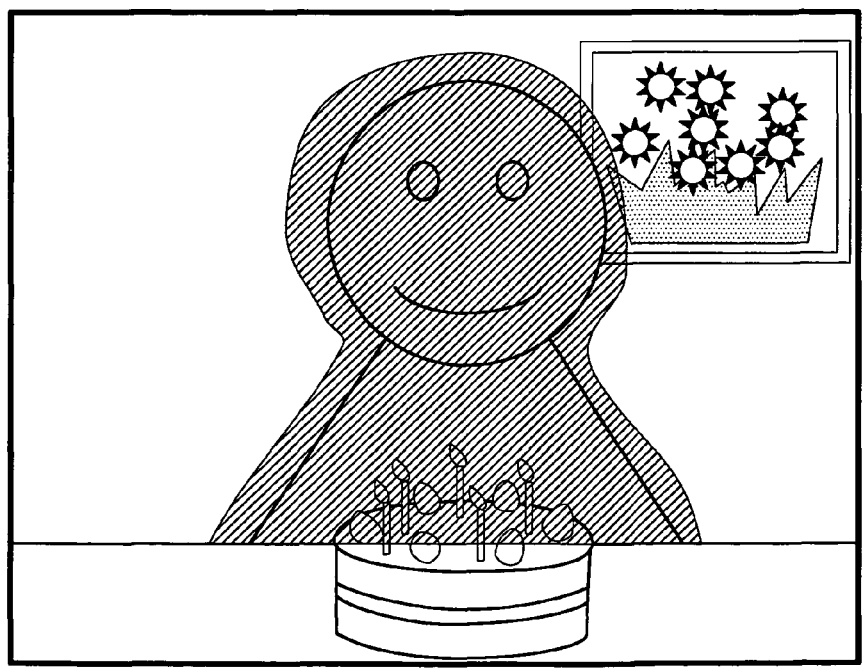
FIG. 13B is an example of a main subject area detected in step S2.

FIGS. 13A and 13B show an example of a detected main subject area. FIG. 13A is an example of the image determined in step S1. FIG. 13B is an example of the main subject area detected in step S2. In FIG. 13B, the diagonally-shaded area is the area detected as the main subject area.

Step S3: The CPU 20 detects a background area based on the main subject area detected in step S2. The CPU 20 detects the area excluding the main subject area detected in step S2 of the image determined in step S1 as a background area. FIG.

Figure 14:
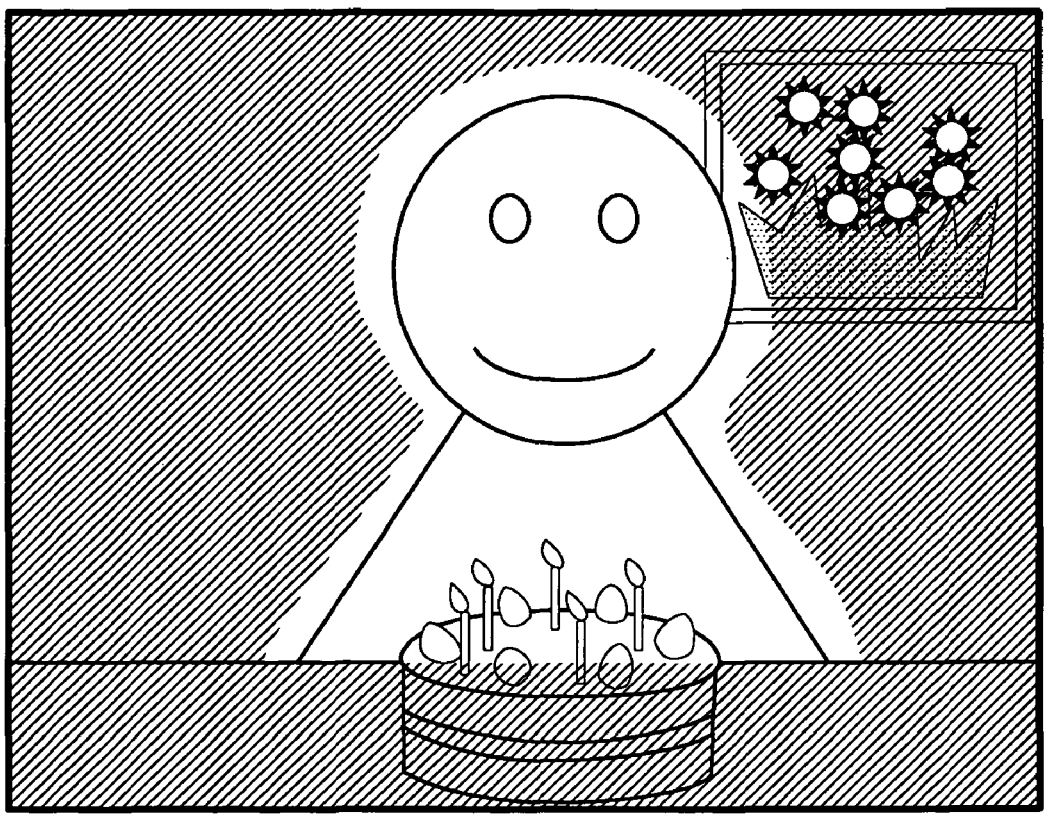
FIG. 14 is a diagram for illustrating a background area.

14 shows an example of a detected background area. In FIG. 14 the diagonally-shaded area is the area detected as the background area.

Step S4: The CPU 20 determines an inserting image to be inserted into the image determined in step S1. The details of this step will be described later.

Figure 15A:
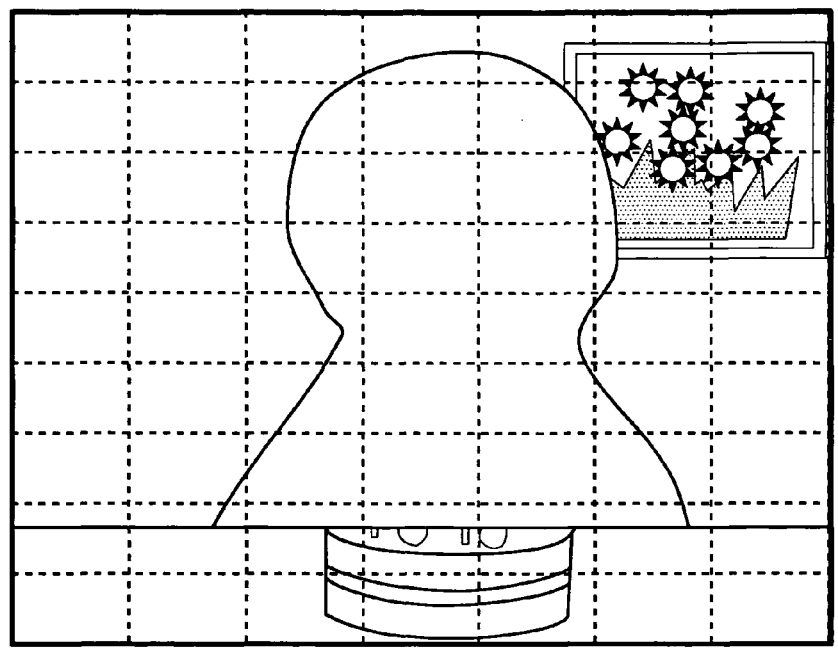
FIG. 15A is a diagram for illustrating selection of an inserting area.

Step S5: The CPU 20 selects an inserting area into which the inserting image determined in step S4 is inserted. The CPU 20 divides the part corresponding to the background area detected in step S3 of the image determined in step S1 into a plurality of blocks. The number of divisions is determined in advance according to the degree of definition of the display element in the image displaying part 2, the number of pixels of the image sensor 13 and the like. FIG. 15A shows an example of the background area divided into blocks.

Then, the CPU 20 calculates the central value of color distribution and the central value of luminance distribution for each block. The central value of color distribution is, for example, an average of color difference signal value of each pixel. The central value of luminance distribution is, for example, an average of luminance signal value of each pixel. The luminance signal value and the color difference signal value of each pixel can be found by a predetermined operation of the values of R, G, and B of each pixel.

Next, the CPU 20 finds a difference of central values of color distribution between neighboring blocks. Similarly, the CPU 20 finds a difference of central values of luminance distribution between neighboring blocks. Then, the CPU 20 determines that the two blocks are successive inserting areas when both the difference between central values of color distribution and the difference between central values of luminance distribution are less than or equal to a predetermined value, respectively.

Further, the CPU 20 similarly finds a difference between central values of luminance distribution and a difference between central values of color distribution for one of the two blocks and a block adjoining the two blocks. Then, the CPU 20 determines that the three blocks are successive inserting areas when each of the difference between central values of luminance distribution and the difference between central values of color distribution is less than or equal to a threshold value. The CPU 20 repeats the above-described processing and selects a plurality of successive blocks as one of inserting-area candidates.

The CPU 20 performs such processing for the overall part corresponding to the background area detected in step S3 of the image determined in step S1. Then, the CPU 20 selects the successive blocks that satisfy the above-described conditions about the difference between central values of color distribution and the difference between central values of luminance distribution as an inserting-area candidate.

Figure 15B:
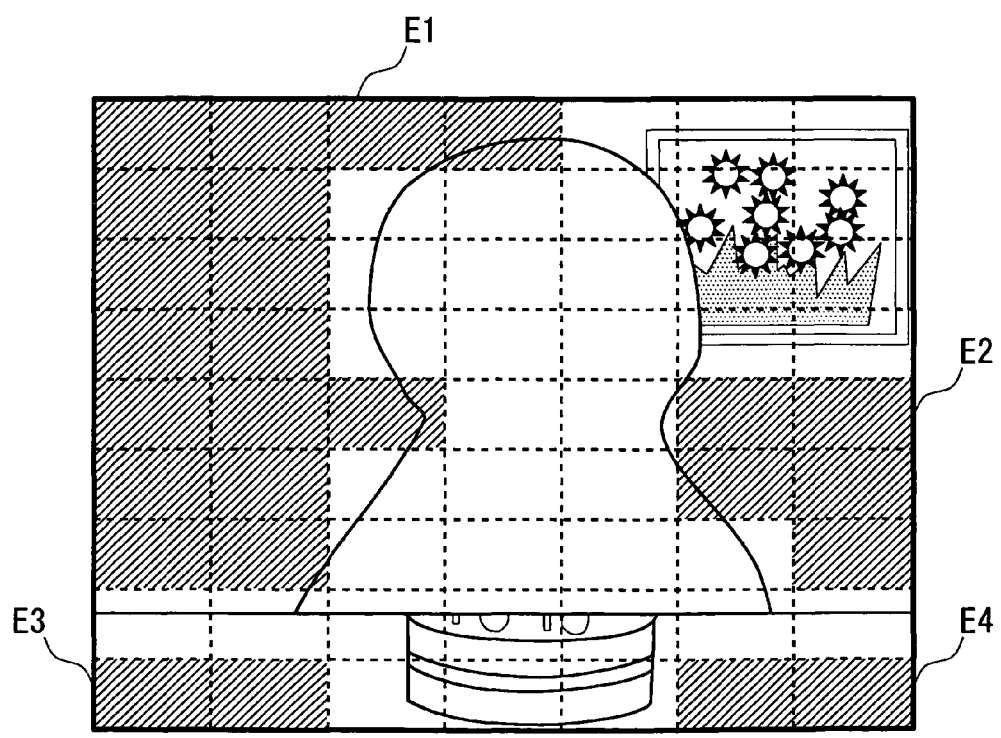
FIG. 15B is a diagram for illustrating selection of an inserting area.

The number of inserting-area candidates selected in this processing is not necessarily limited to one. Two or more inserting-area candidates may be selected depending on the content of the background area. FIG. 15B shows an example of selected inserting-area candidates. In FIG. 15B, the diagonally-shaded areas are the areas selected as inserting-area candidates. In the example of FIG. 15B, four areas E1 to E4 are selected as inserting-area candidates. Each of these four areas is an area in which color distribution and luminance distribution are approximately uniform. Because of this, they are suitable for the insertion of an inserting image.

Step S6: The CPU 20 determines an inserting area of the inserting image determined in step S4. The details of this step will be described later.

Step S7: The CPU 20 synthesizes the inserting image determined in step S4 into the image determined in step S1 to generate a composite image. The details of this step will be described later.

Step S8: The CPU 20 controls each part to record the image data of the composite image temporarily recorded in the memory 15 in the recording medium 17. It may also be possible for the CPU 20 to record the image into which the inserting image is inserted and the composite image generated in step S7 in the recording medium 17 after associating them with each other. It may also be possible for the CPU 20 to record the image data of the image into which the inserting image is inserted, the image data of the inserting image, and the positional information of the inserting area in the recording medium 17 after associating them with one another without inserting the inserting image. It may also be possible for the CPU 20 to record the image data of the image into which the inserting image is inserted, the image data of the inserting image, and the information about insertion (part or all of the information about the main subject area, the information about the background, and the information of the inserting area) in the recording medium 17 after associating them with one another without determining the inserting area. It may also be possible for the CPU 20 to record the image data of the inserting image to be input in step S11, to be described later, as the image data of the inserting image. It may also be possible for the CPU 20 to record the image data of the inserting image having been edited in step S18 to step S24, to be described later, as the image data of the inserting image.

Figure 3:
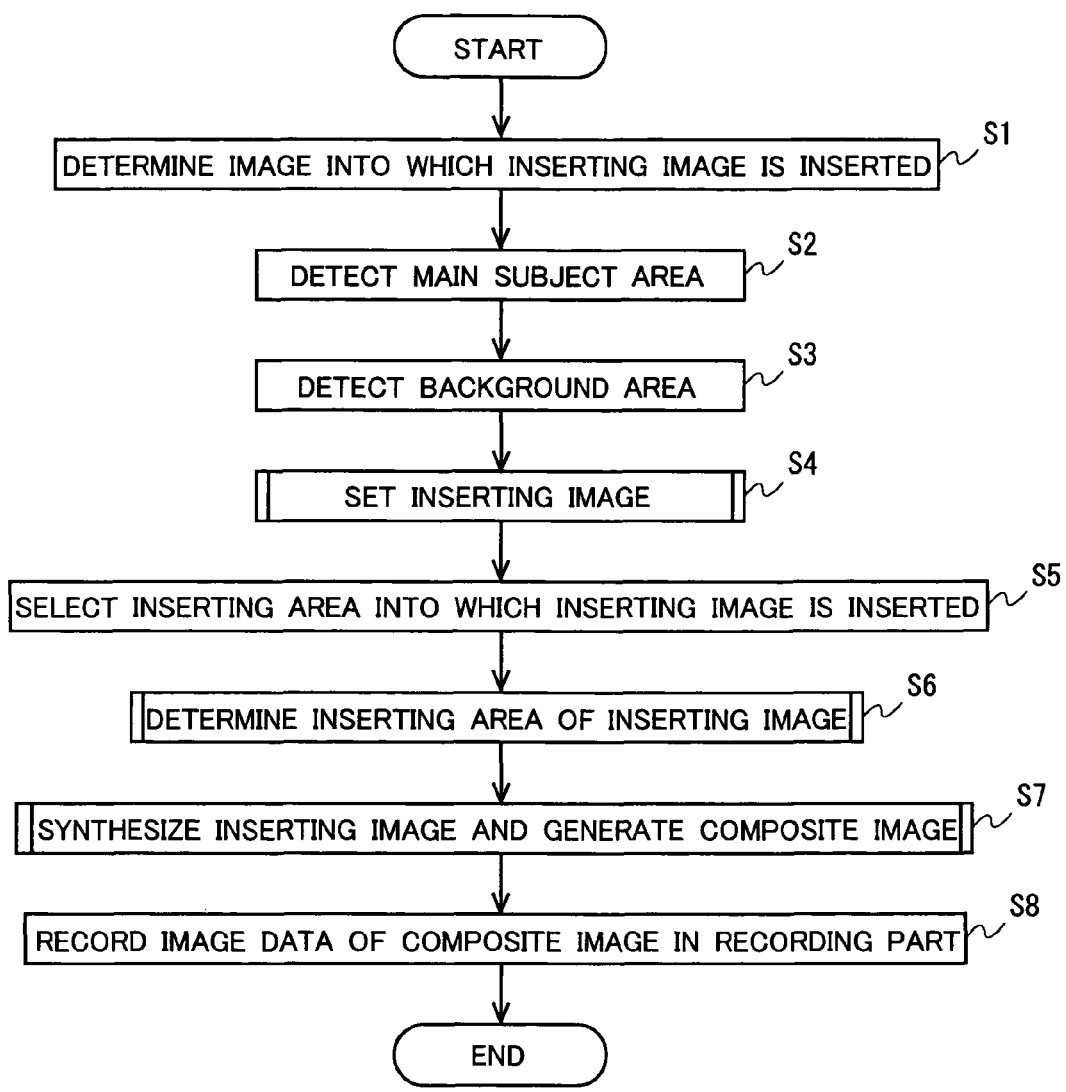
FIG. 3 is a flowchart showing the operation of the electronic camera 1 in the first embodiment.
Figure 4:
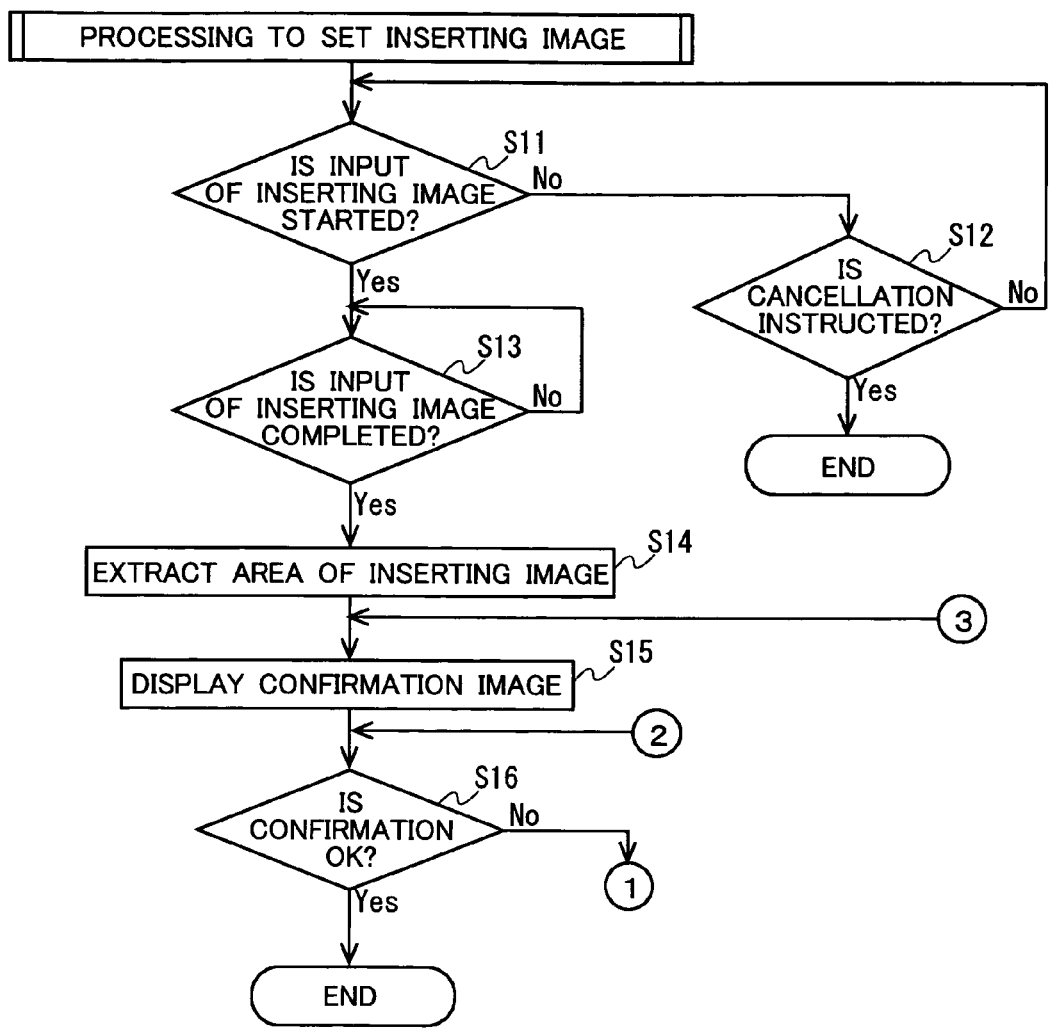
FIG. 4 is another flowchart showing the operation of the electronic camera 1 in the first embodiment.
Figure 5:
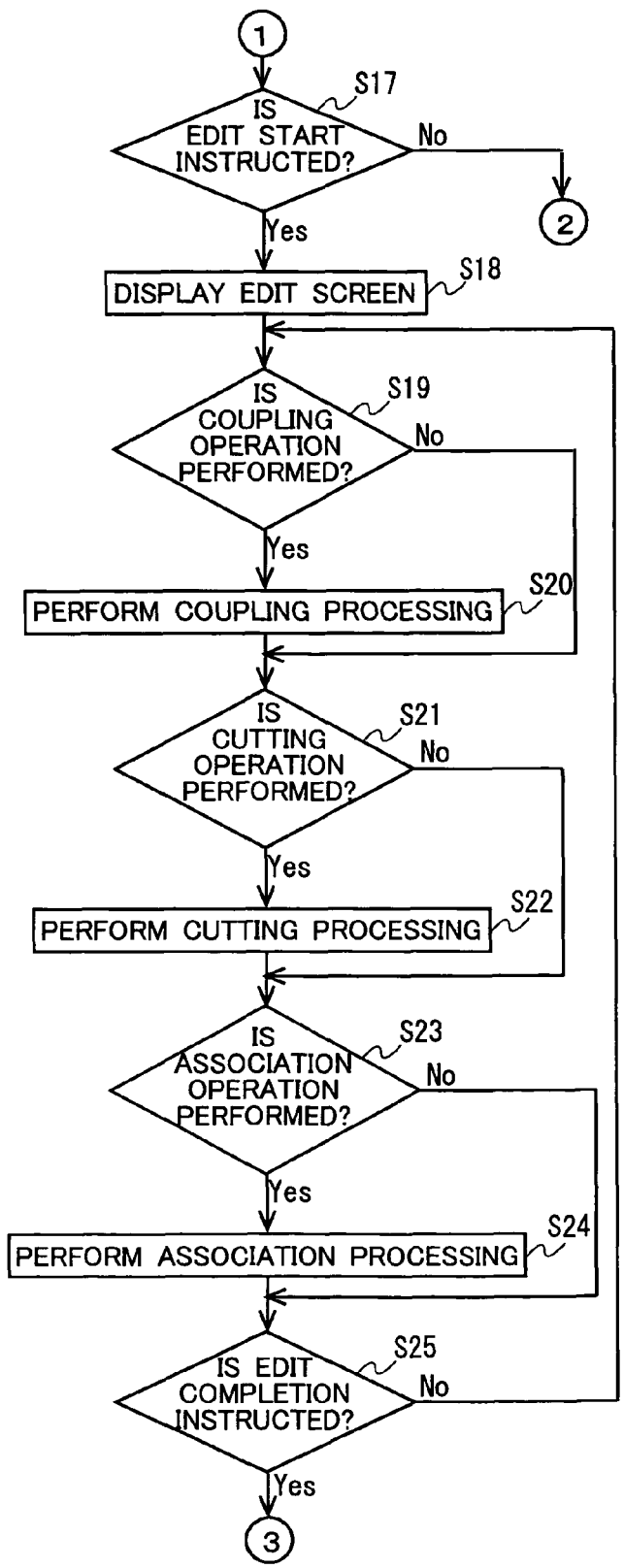
FIG. 5 is another flowchart showing the operation of the electronic camera 1 in the first embodiment.
Figure 6:
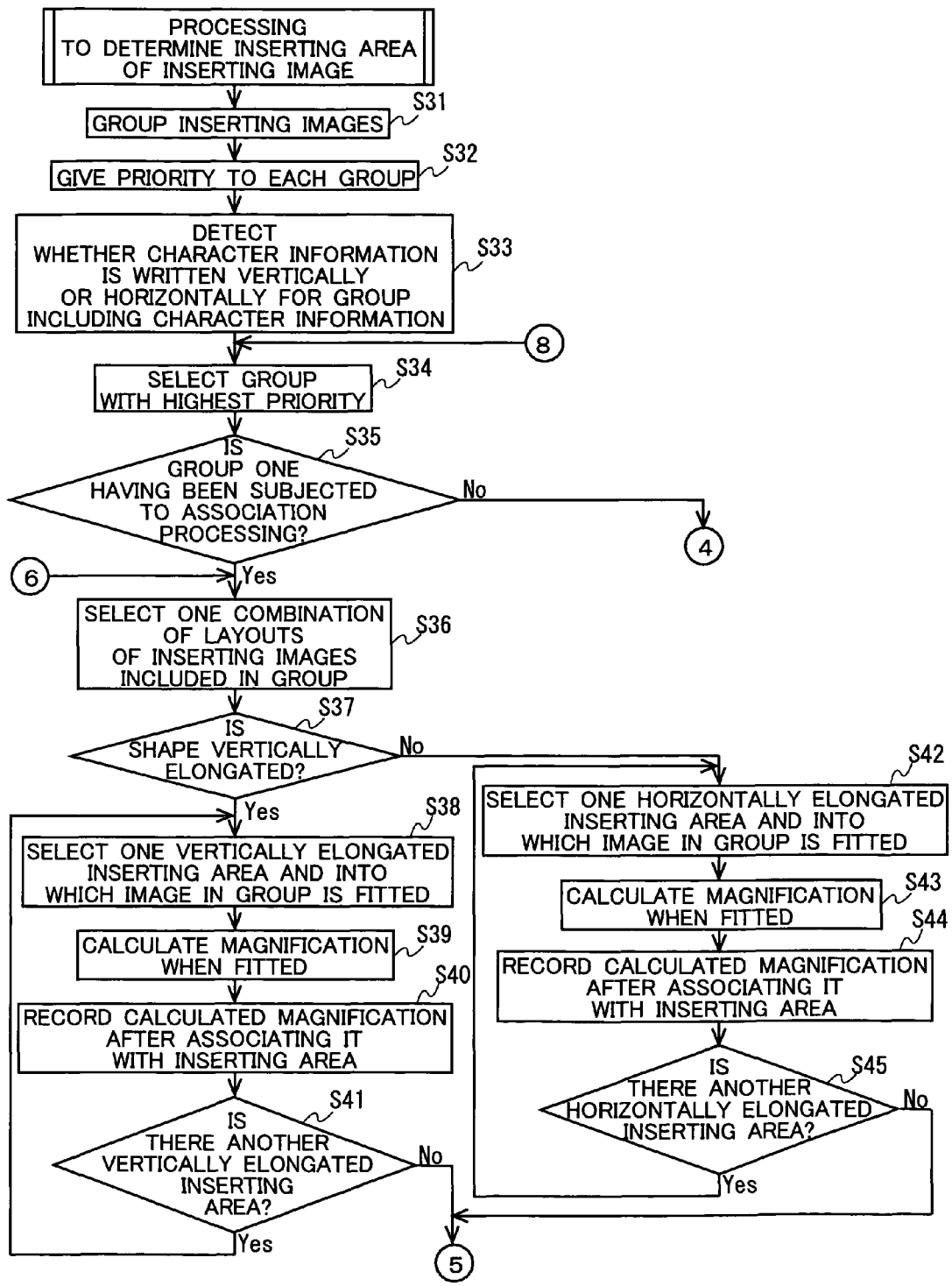
FIG. 6 is another flowchart showing the operation of the electronic camera 1 in the first embodiment.
Figure 7:
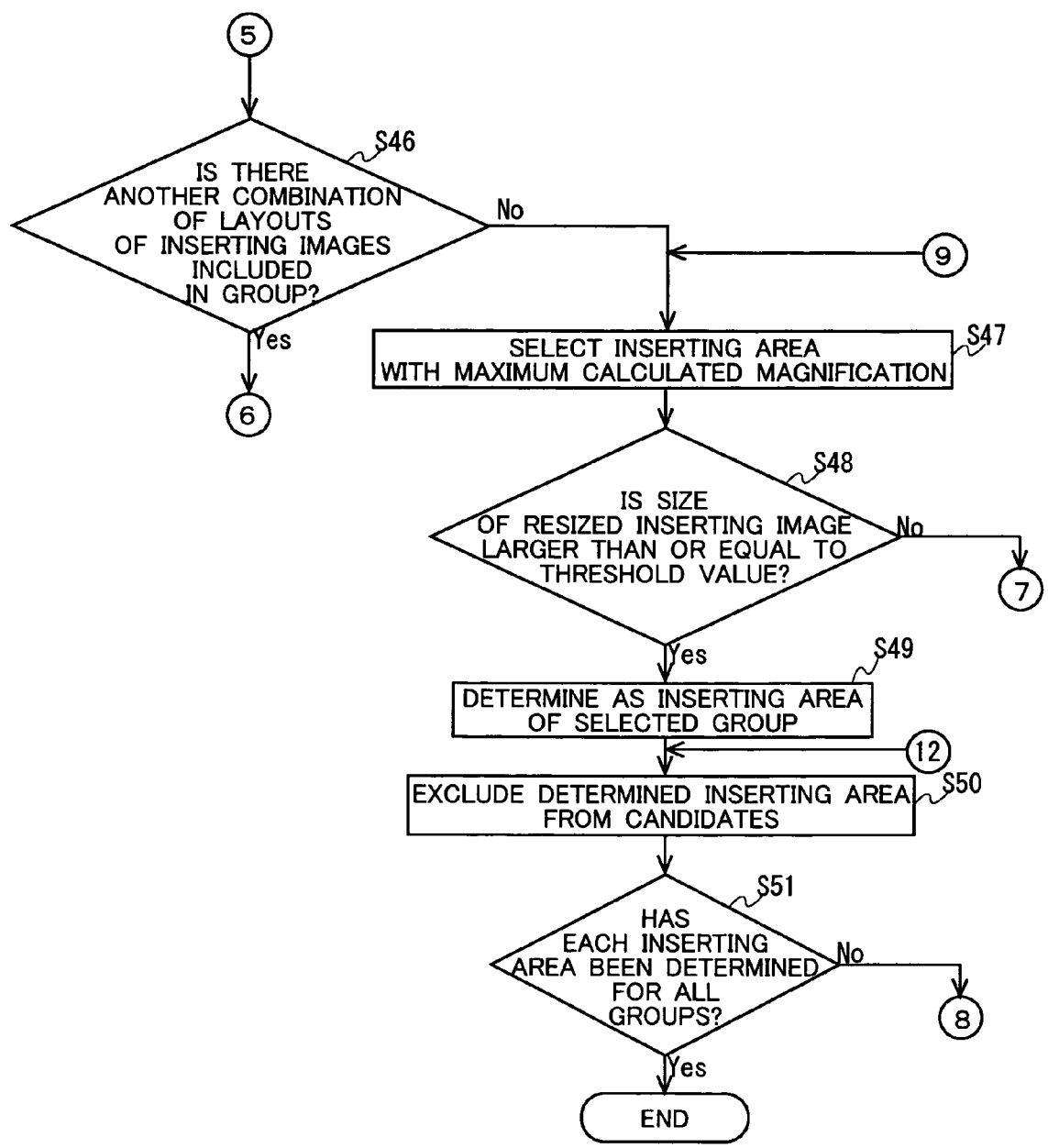
FIG. 7 is another flowchart showing the operation of the electronic camera 1 in the first embodiment.
Figure 8:
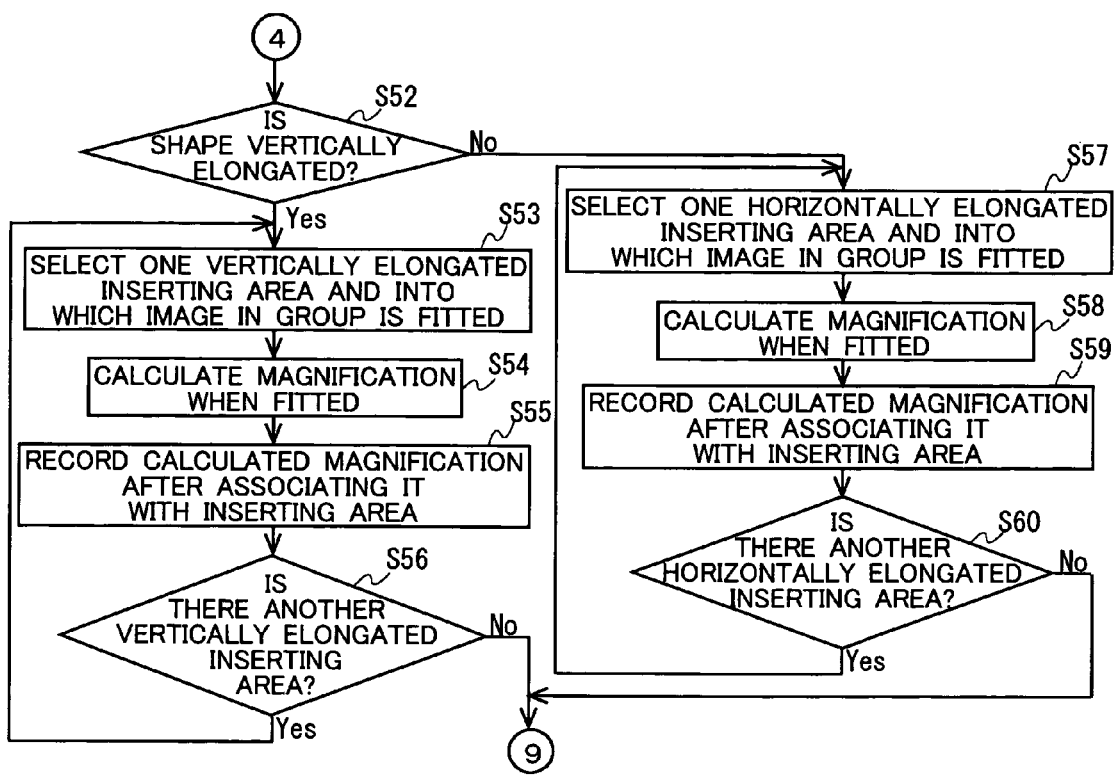
FIG. 8 is another flowchart showing the operation of the electronic camera 1 in the first embodiment.
Figure 9:
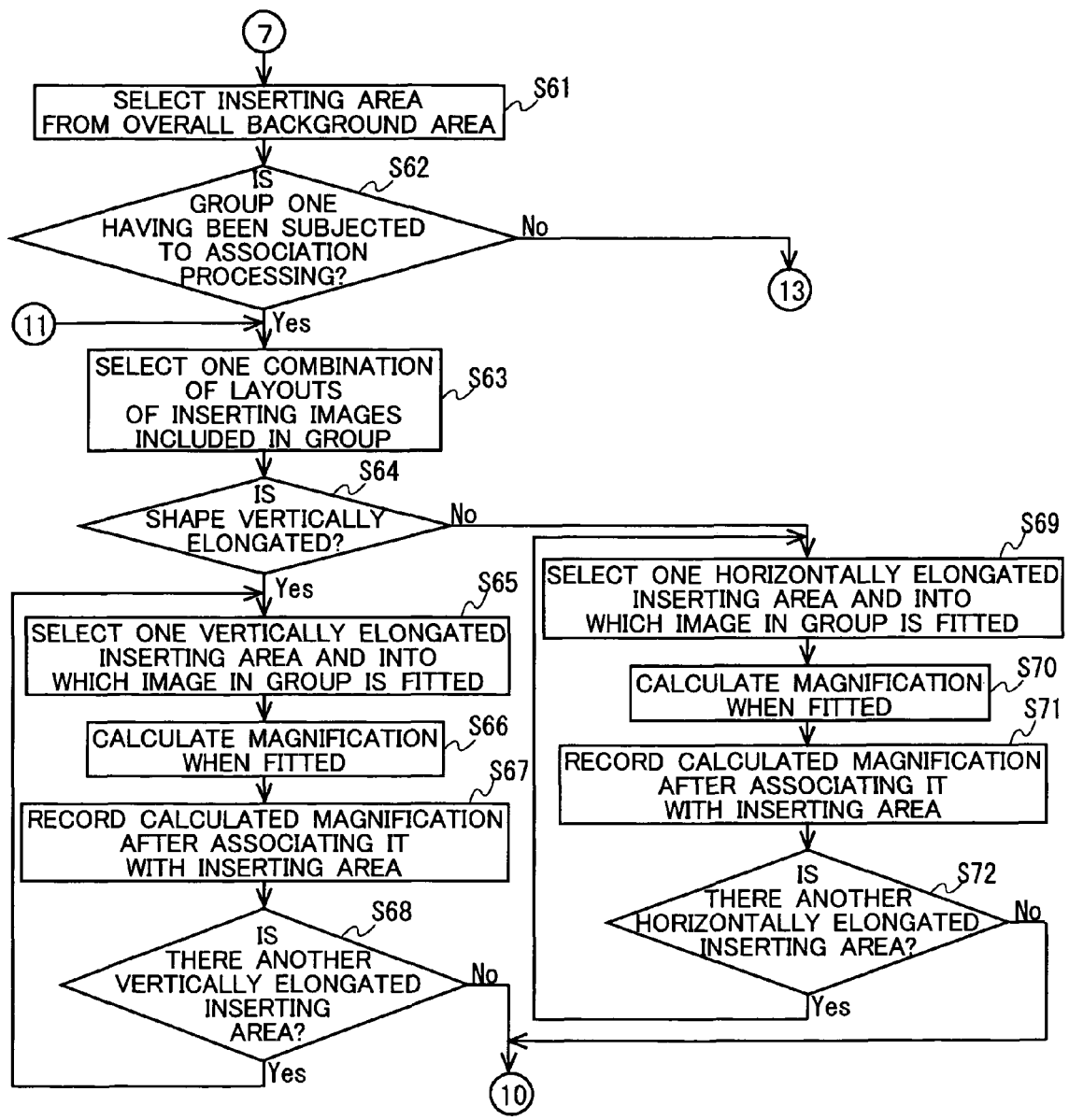
FIG. 9 is another flowchart showing the operation of the electronic camera 1 in the first embodiment.
Figure 10:
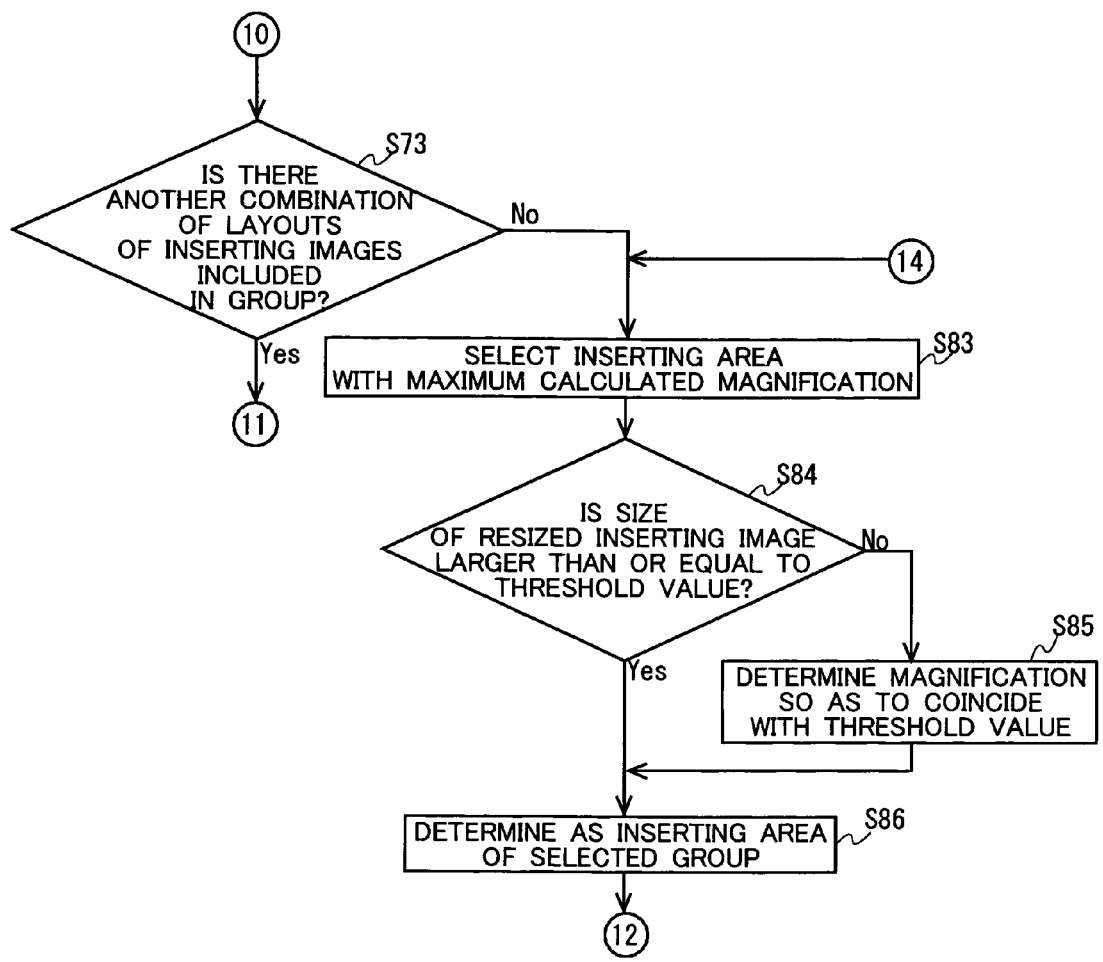
FIG. 10 is another flowchart showing the operation of the electronic camera 1 in the first embodiment.
Figure 11:
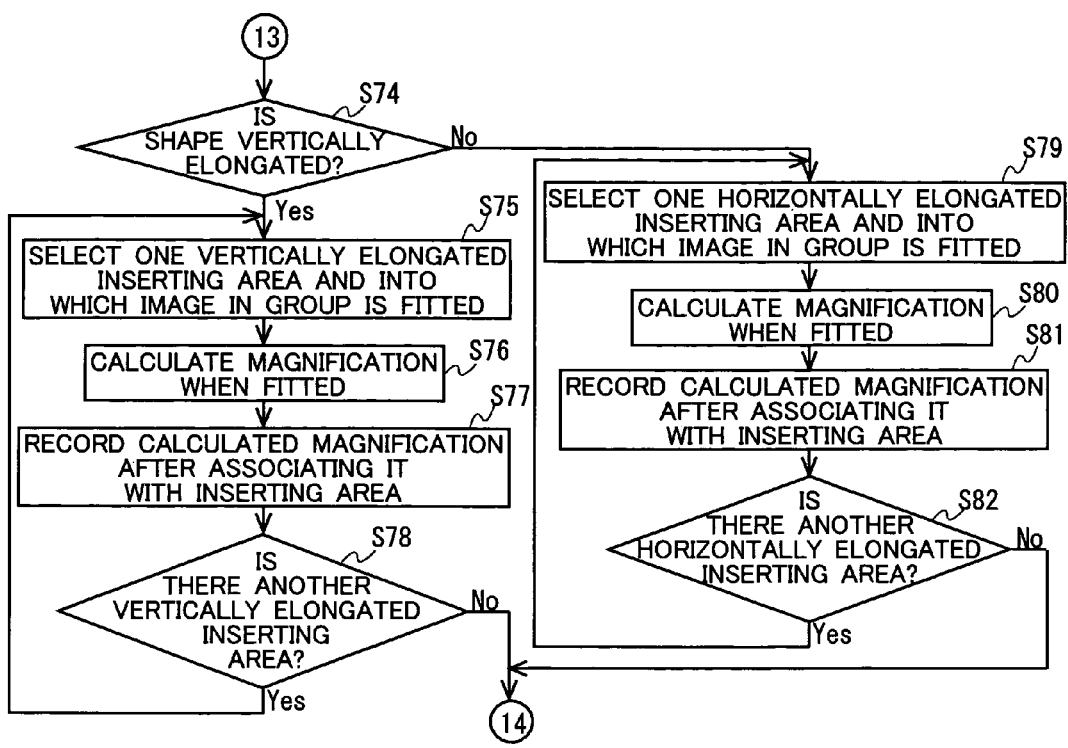
FIG. 11 is another flowchart showing the operation of the electronic camera 1 in the first embodiment.

Next, the operation of the CPU 20 when determining an inserting image described in step S4 in the flowchart in FIG. 3 will be described using the flowcharts in FIG. 4 and FIG. 5.

Step S11: The CPU 20 determines whether or not the input of the inserting image is started. Then, the CPU 20 advances the procedure to step S13, to be described later, when the input of the inserting image is started. On the other hand, when determining that the input of the inserting image is not started after a lapse of a fixed period of time, the CPU 20 advances the procedure to step S12. It is possible for a user to input the above-described three kinds of inserting image by operating the operating part 18 or touching the touch panel 21.

Figure 16A:
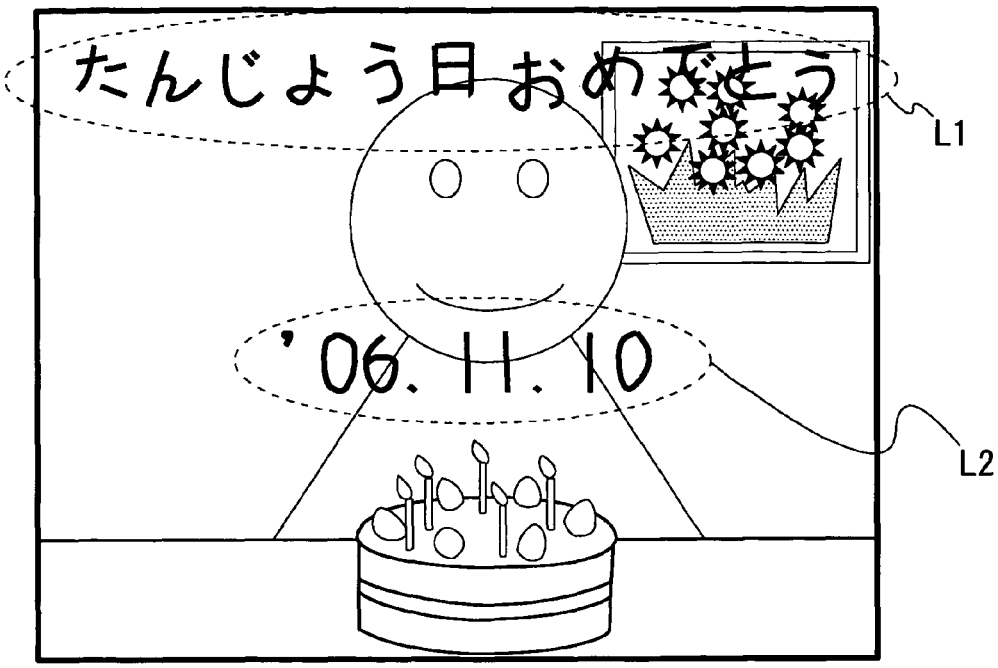
FIG. 16A shows an input example of an inserting image of handwritten information.

FIG. 16A shows an input example of an inserting image of handwritten information. In the example in FIG. 16A, the characters "Happy birthday" are input in a part L1, the characters "Happy birthday" being written in Japanese language. In a part L2, the characters "Nov. 10, 2006" are input. When inputting an inserting image of handwritten information, it is possible to input handwritten information regardless of the main subject area and the background area as shown in FIG. 16A. In this manner, by making it possible to input using the overall display surface of the image displaying part 2 (touch panel 21), the input of characters etc. is made easy. In addition, even when the resolution of the touch panel 21 is low, characters in large size can be written, and therefore, it is possible to input easy-to-recognize characters etc.

For an inserting image by character recognition processing, the CPU 20 subjects the handwritten information input in the parts L1 and L2 in FIG. 16A to the character recognition processing. Then, the CPU 20 takes text information obtained by the character recognition processing as an inserting image.

Figure 16B:
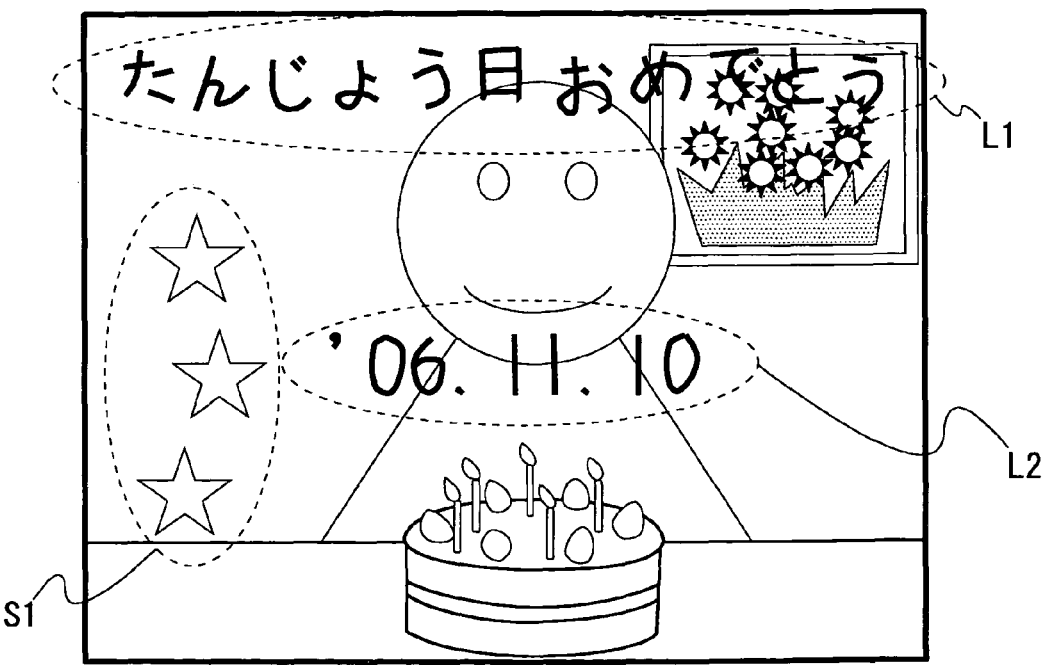
FIG. 16B shows an input example of an inserting image of stamp information.

FIG. 16B shows an input example of an inserting image of stamp information. In the example in FIG. 16B, three star-shaped symbols are input in a part S1. When inputting an inserting image of stamp information also, it is possible to input stamp information regardless of the main subject area and the background area as shown in FIG. 16B.

Step S12: The CPU 20 determines whether or not a cancellation is instructed. Then, the CPU 20 ends a series of processing to determine an inserting image when a cancellation is instructed. On the other hand, when determining that no cancellation is instructed, the CPU 20 returns the procedure to step S11. The instruction of cancellation is given by a user through the operating part 18 or the touch panel 21.

Step S13: The CPU 20 determines whether or not the input of an inserting image is completed. Then, when determining that the input of an inserting image is completed, the CPU 20 advances the procedure to step S14. The instruction of input completion of an inserting image is given by a user through the operating part 18 or the touch panel 21. It may also be possible for the CPU 20 to determine that the input of an inserting image is completed if the input operation of an inserting image by a user is not performed after a lapse of a fixed period of time.

Step S14: The CPU 20 extracts an area of an inserting image.

Figure 17A:
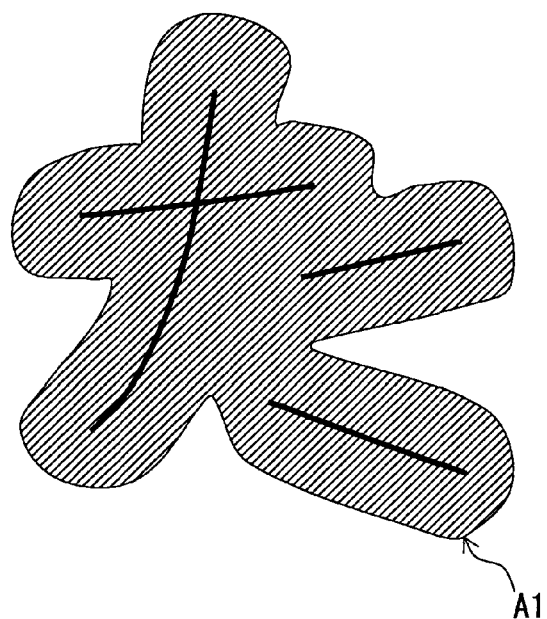
FIG. 17A is a diagram for illustrating extraction of an area of an inserting image.
Figure 17B:
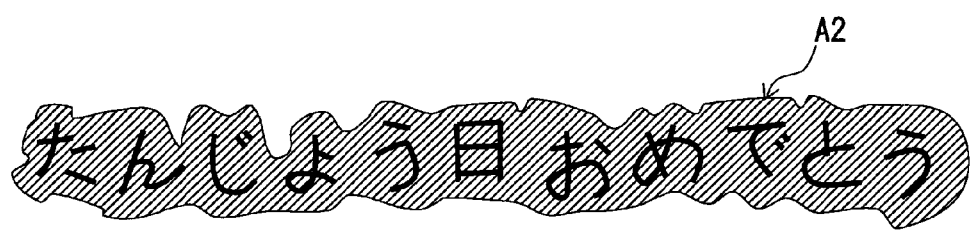
FIG. 17B is a diagram for illustrating extraction of an area of an inserting image.

FIG. 17A shows an example of an area of an extracted inserting image. FIG. 17A is an enlarged view of the part of "H" of the inserting image of handwritten information described in the part L1 in FIG. 16A. The CPU 20 finds a locus of a pixel a predetermined number of pixels apart from a point at which contact is detected at the time of handwriting information. Then, the CPU 20 extracts the area in which the locus is closed as an area of the inserting image. In the example in FIG. 17A, an area A1 is extracted. FIG. 17B shows an example of an area extracted for the overall inserting image of handwritten information described in the part L1 in FIG. 16A. In the example in FIG. 17B, an area A2 is extracted.

Figure 17C:
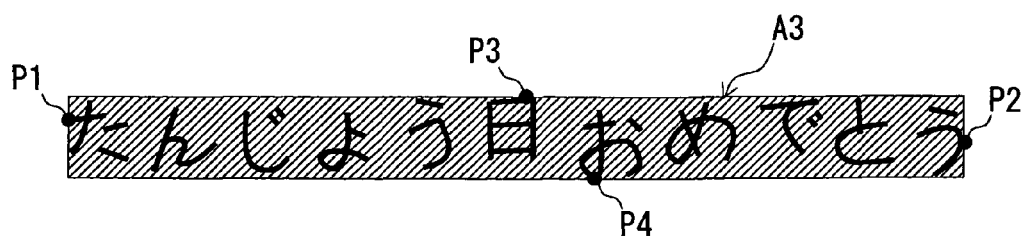
FIG. 17C is a diagram for illustrating extraction of an area of an inserting image.

The extraction of an area of inserting image may be simplified. For example, as shown in FIG. 17C, it may also be possible to extract a rectangular area A3 based on four points of the points at which contact is detected at the time of handwriting information, that is, a point P1 that is located in the leftmost position, a point P2 that is located in the rightmost position, a point P3 located in the uppermost position, and a point P4 located in the lowermost position.

Hereinafter, description will be given with an example when an area of an inserting image is extracted by the method described using FIG. 17A and FIG. 17B.

After performing processing similar to that described using FIG. 17A and FIG. 17B for all of the input inserting images, the CPU 20 advances the procedure to step S15.

Figure 18:
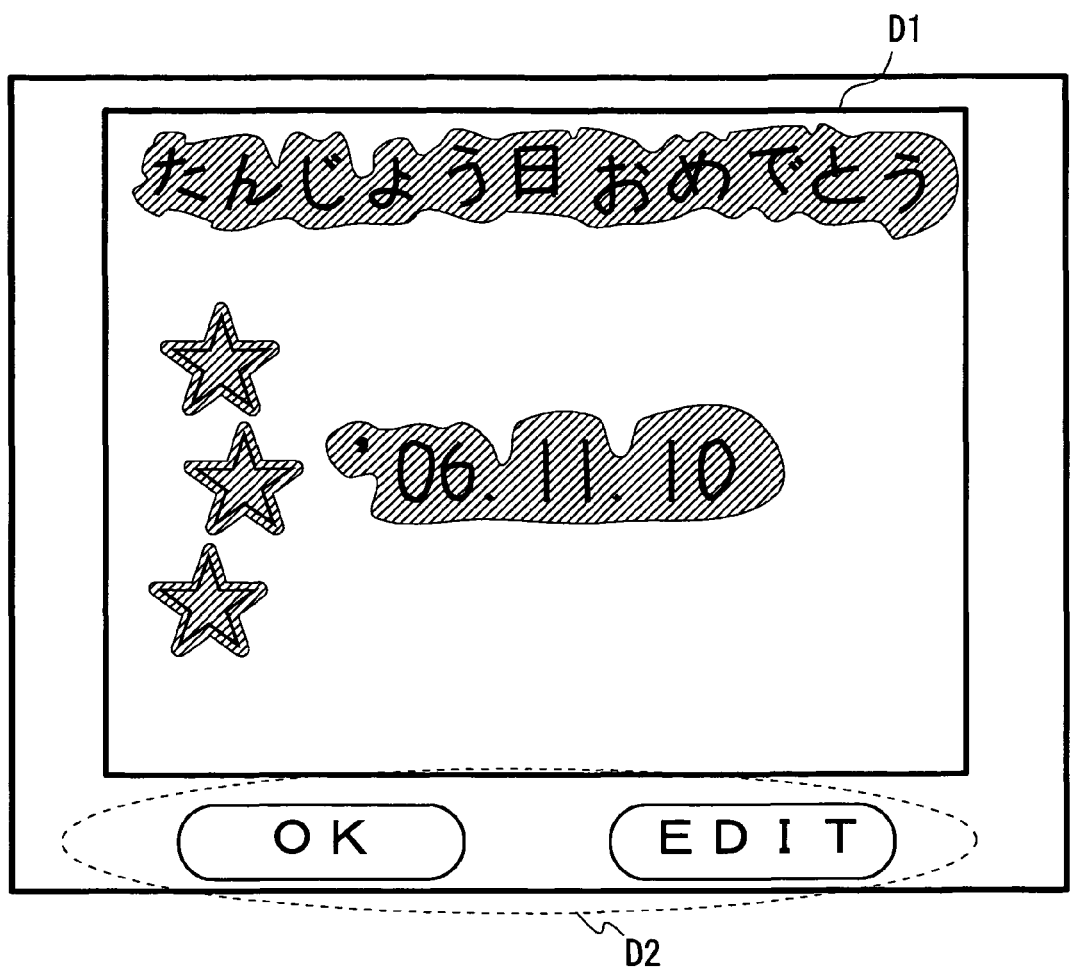
FIG. 18 is a diagram showing an example of an edit screen.

Step S15: The CPU 20 controls the display controlling part 19 and displays a confirmation image on the image displaying part 2. As shown in FIG. 18, the CPU 20 displays the area of the inserting image extracted in step S14 in a display area D1 of the image displaying part 2. In addition, as shown in FIG. 18, the CPU 20 displays an "OK" button and an "Edit" button in a display area D2 of the image displaying part 2.

In the example in FIG. 18, an example is shown, in which only the area of the inserting image extracted in step S14 is displayed on the image displaying part 2, however, it may also be possible to display the image indicative of the area of the inserting image extracted in step S14 by overlapping it on the image into which the inserting image is inserted in a manner similar to that in the example in FIG. 16B.

Step S16: The CPU 20 determines whether or not "confirmation OK" is instructed. Then, the CPU 20 ends a series of processing to determine an inserting image when "confirmation OK" is instructed. On the other hand, when determining that "confirmation OK" is not instructed, the CPU 20 advances the procedure to step S17. The instruction of "confirmation OK" is given by a user selecting the "OK" button described in FIG. 18.

Step S17: The CPU 20 determines whether or not "edit start" is instructed. Then, the CPU 20 advances the procedure to step S18 when "edit start" is instructed. On the other hand, when determining that "edit start" is not instructed, the CPU 20 returns the procedure to step S16. The instruction of "edit start" is given by a user selecting the "Edit" button described in FIG. 18.

Step S18: The CPU 20 controls the display controlling part 19 and displays an edit screen on the image displaying part 2.

Figure 19A:
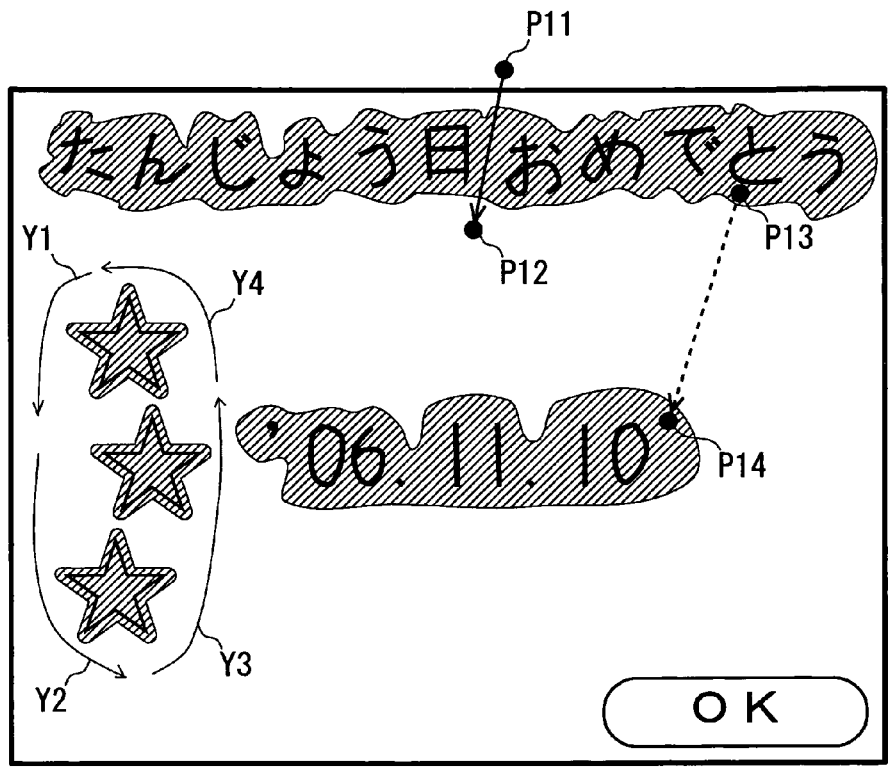
FIG. 19A is a diagram for illustrating an operation that utilizes an edit screen.

FIG. 19A shows an example of an edit screen. On the edit screen, as shown in FIG. 19A, the area of inserting image extracted in step S14 and the "OK" button are displayed.

Step S19: The CPU 20 determines whether or not a user performs a coupling operation using the touch panel 21. Then, the CPU 20 advances the procedure to step S20 when the coupling operation is performed. On the other hand, when determining that no coupling operation is performed, the CPU 20 advances the procedure to step S21, to be described later. The coupling operation is performed by a user performing an operation to enclose a plurality of extracted areas (arrow Y1 to arrow Y4) using the touch panel 21.

Step S20: The CPU 20 performs coupling processing. The CPU 20 couples the plurality of areas for which the coupling operation has been performed in step S19 as a single area. FIG. 19B shows an example of the area in which three star-shaped symbols are coupled.

Step S21: The CPU 20 determines whether or not a cutting operation is performed by a user using the touch panel 21. Then, the CPU 20 advances the procedure to step S22 when the cutting operation is performed. On the other hand, when determining that the cutting operation is not performed, the CPU 20 advances the procedure to step S23, to be described later. The cutting operation is performed by a user inputting a straight line connecting two points (point P11 and point P12) outside the extracted area using the touch panel 21.

Figure 19C:
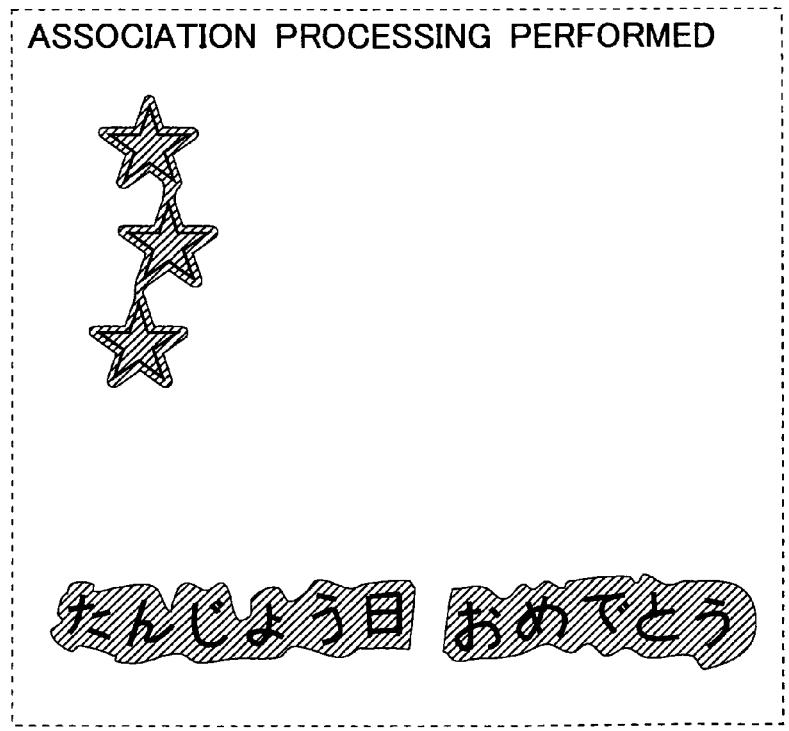
FIG. 19C is a diagram for illustrating an operation that utilizes an edit screen.

Step S22: The CPU 20 performs cutting processing. The CPU 20 cuts the area for which the cutting operation has been performed in step S21 in accordance with the input straight line. FIG. 19C shows an example of the area, in which "Happy birthday" described in the part L1 in FIG. 16A is cut into "Happy" and "birthday".

Step S23: The CPU 20 determines whether or not a user has performed an association operation using the touch panel 21. Then, the CPU 20 advances the procedure to step S24 when the association operation is performed. On the other hand, when determining that the association operation is not performed, the CPU 20 advances the procedure to step S25, to be described later. The association operation is performed by a user performing an operation to continuously and independently select points (point 13 and point 14) in the plurality of extracted areas using the touch panel 21.

Step S24: The CPU 20 performs association processing. The CPU 20 records the information indicating that the association operation has been performed and the information indicative of the area to be associated after associating them with the inserting image in the area for each of the areas for which the association operation has been performed in step S23.

Step S25: The CPU 20 determines whether or not "edit completion" is instructed.

Then, the CPU 20 ends a series of processing to determine an inserting image when "edit completion" is instructed. On the other hand, when determining that "edit completion" is not instructed, the CPU 20 returns the procedure to step S19. The instruction of "edit completion" is given by a user selecting the "OK" button described in FIG. 19A.

Figure 20:
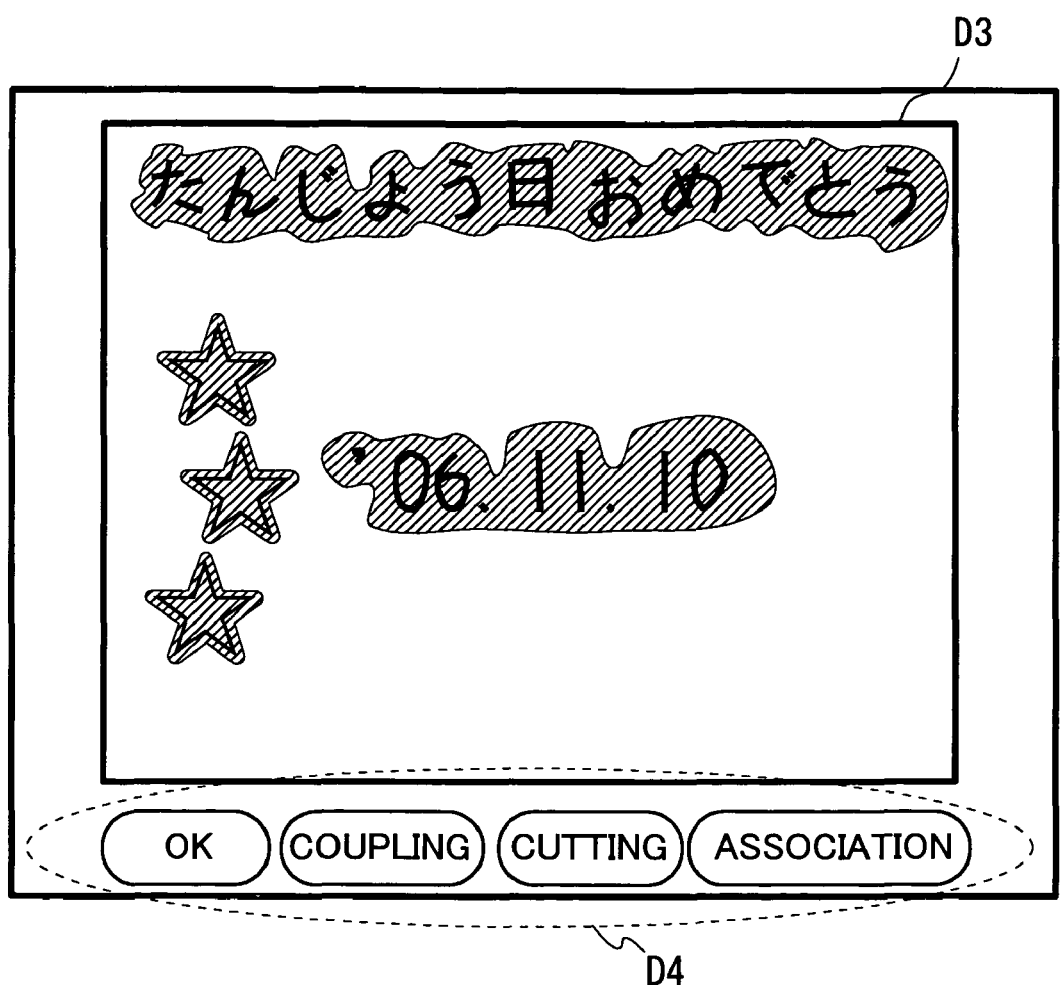
FIG. 20 is a diagram showing another example of an edit screen.

It may also be possible to display a button relating to edit etc. on the edit screen described in step S18. For example, as shown in FIG. 20, in a display area D3 of the image displaying part 2, the extracted area of inserting image to be edited is displayed. In addition, "OK" button, "Coupling" button, "Cutting" button, and "Association" button are displayed in a display area D4 of the image displaying part 2. It is possible for a user to operate these buttons using the touch panel 21. Then, the CPU 20 executes processing in accordance with the function of each button (steps S20, S22 and S24).

Next, the operation of the CPU 20 when determining an inserting area of an inserting image described in step S6 of the flowchart in FIG. 3 will be described using the flowcharts in FIG. 6 to FIG. 11

Hereinafter, it is assumed that the handwritten information "Nov. 10, 2006" shown in FIG. 19A, the inserting image of the three coupled star-shaped symbols shown in FIG. 19B, and the handwritten information "Happy" and "birthday" shown in FIG. 19C are determined in the above-described processing to determine an inserting image. Further, description will be given on the assumption that the inserting image of the three coupled star-shaped symbols shown in FIG. 19B and the handwritten information shown in FIG. 19C have been subjected to the association processing.

Step S31: The CPU 20 groups inserting images. The CPU 20 groups the plurality of inserting images having been subjected to the association processing into a single group. In the example shown in FIG. 19A, the handwritten information "Nov. 10, 2006" shown in FIG. 19A is set as a first group. Then, the inserting image of the three coupled star-shaped symbols shown in FIG. 19B and the handwritten information shown in FIG. 19C are set as a second group.

Step S32: The CPU 20 gives priority to each group grouped in step S31. The CPU 20 finds the total area of the inserting images included in each group. Then, the CPU 20 gives priority to each group in a descending order of area. In the example shown in FIG. 19A, the second group is given the highest priority. The first group is given the second highest priority.

It may also be possible to give priority according to an order of input of each inserting image or according to an instruction of priority by a user, in addition to the order according to area. It may also be possible to give priority by combining a plurality of factors.

Step S33: The CPU 20 detects whether text in a group including character information is written vertically or horizontally. Determining whether text is written vertically or horizontally is performed based on the input direction when handwritten information is input or the aspect ratio of the inserting image. When the input direction when handwritten information is input is from left to right, it is possible to determine that the text is written horizontally. When the input direction when handwritten information is input is from top to bottom, it is possible to determine that the text is written vertically. In addition, when the aspect ratio is such that the width is longer than its height, it is possible to determine that the text is written horizontally. Conversely, when the aspect ratio is such that the height is longer than its width, it is possible to determine that the text is written vertically.

Step S34: The CPU 20 selects a group with highest priority. Here, the CPU 20 selects the second group. The CPU 20 selects the inserting image of the three coupled star-shaped symbols shown in FIG. 19B and the handwritten information shown in FIG. 19C.

Step S35: The CPU 20 determines whether or not the group selected in step S34 is a group for which the association processing has been performed. Then, the CPU 20 advances the procedure to step S36 when determining that the group is a group for which the association processing has been performed. On the other hand, when determining that the group is not a group for which the association processing has been performed, the CPU 20 advances the procedure to step S52, to be described later.

Step S36: The CPU 20 selects one of combinations of layouts of the inserting images included in the group selected in step S34. There can be thought two kinds of combination of layouts of inserting images, that is, a combination in the vertical direction and one in the horizontal direction. When text information written horizontally is included, there can be thought a layout in the direction from top to bottom shown in FIG. 21A and a layout in the direction from left to right shown in FIG. 21B. When text information written vertically is included, there can be thought a layout in the direction from top to bottom shown in FIG. 22A and a layout in the direction from left to right shown in FIG. 22B.

Step S37: The CPU 20 determines whether or not the overall shape is vertically elongated when the inserting images included in the group selected in step S34 are arranged in the combination of layouts selected in step S36. Then, when determining that the overall shape is vertically elongated, the CPU 20 advances the procedure to step S38. On the other hand, when determining that the overall shape is not vertically elongated (but horizontally elongated), the CPU 20 advances the procedure to step S42, to be described later.

Figure 21A:
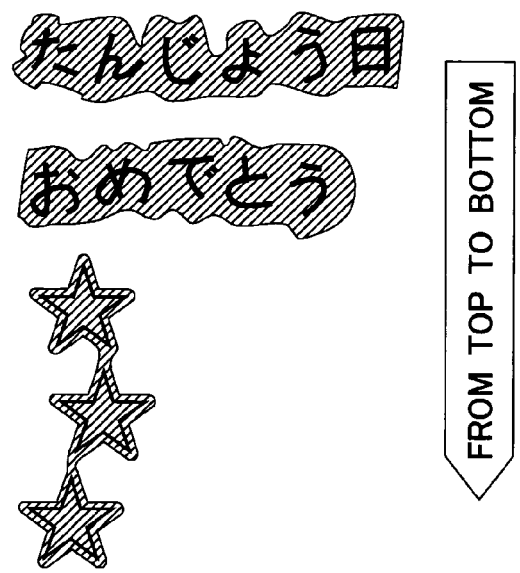
FIG. 21A is a diagram for illustrating a combination of layouts of inserting images.
Figure 21B:
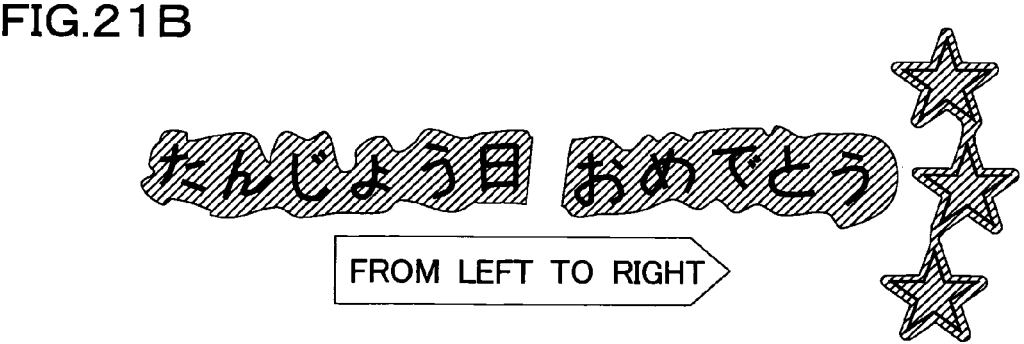
FIG. 21B is a diagram for illustrating a combination of layouts of inserting images.
Figure 22A:
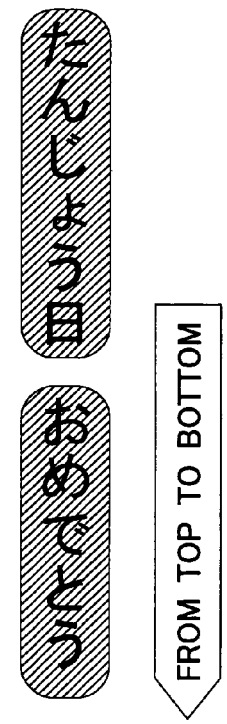
FIG. 22A is another diagram for illustrating a combination of layouts of inserting images.
Figure 22A:
Figure 22B:
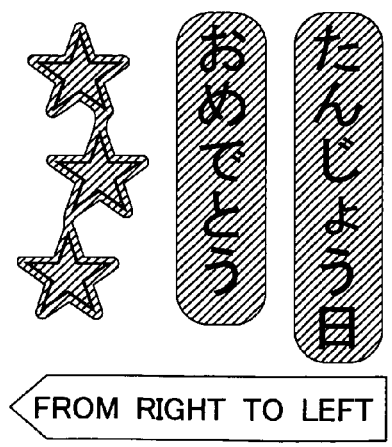
FIG. 22B is another diagram for illustrating a combination of layouts of inserting images.

In the examples in FIG. 21 and FIG. 22, the combination of layouts shown in FIG. 21A and FIG. 22A has a vertically elongated shape. On the other hand, the combination of layouts shown in FIG. 21B and FIG. 22B has a horizontally elongated shape.

Step S38: The CPU 20 selects one vertically elongated inserting area and fits the inserting images included in the group selected in step S34 into the inserting area. Whether the inserting area is vertically elongated or horizontally elongated is found from the aspect ratio based on the maximum length in the vertical direction and the maximum length in the horizontal direction of the inserting area. Of the four areas E1 to E4 shown in FIG. 15B, the area E1 and the area E2 are vertically elongated areas. The area E3 and the area E4 are horizontally elongated areas.

The CPU 20 selects one vertically elongated inserting area and fits the inserting images in the group selected in step S34, which are arranged in the combination of layouts selected in step S36, into the inserting area. Then, the CPU 20 changes the fitting position and finds a position in which the magnification is the maximum.

Step S39: The CPU 20 calculates the magnification when the inserting image is fit into the position found in step S38.

Step S40: The CPU 20 records the magnification calculated in step S39 after associating it with the inserting area selected in step S38.

Step S41: The CPU 20 determines whether or not there is another vertically elongated inserting area. Then, when determining that there is another vertically elongated inserting area, the CPU 20 returns the procedure to step S38. That is, the CPU 20 performs the same processing for all of the vertically elongated inserting areas.

Figure 23A:
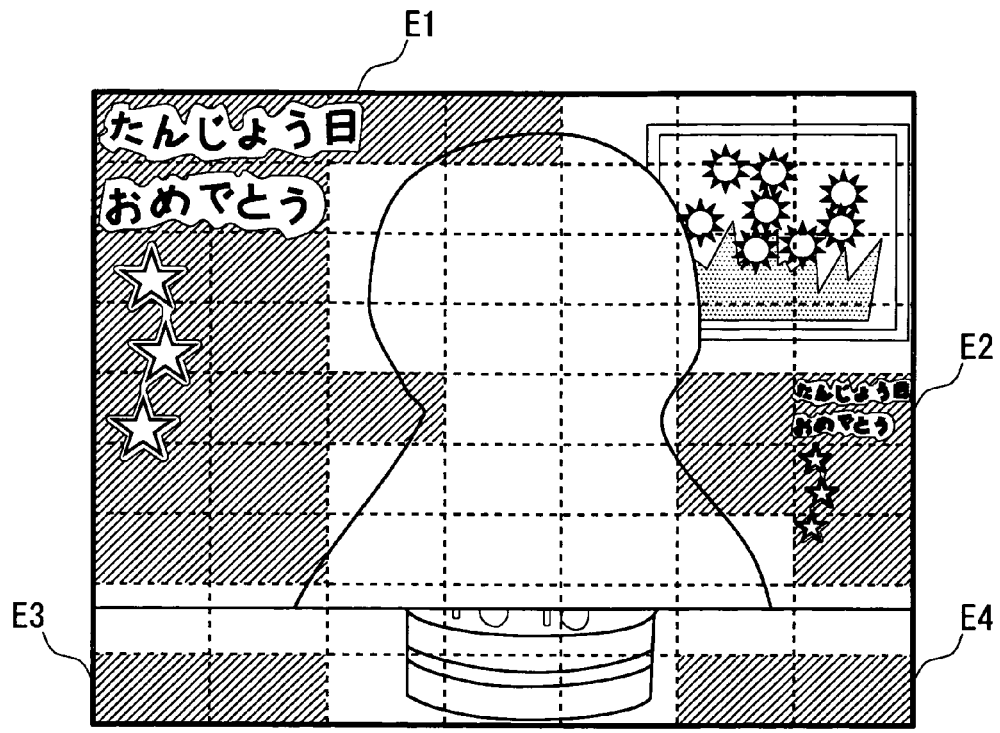
FIG. 23A is a diagram for illustrating determination of an inserting area.

FIG. 23A shows an example, in which the inserting images in the second group (group selected in step S34) are arranged in the vertical direction as shown in FIG. 21A (arranged in the combination of layouts selected in step S36) and fit into the vertically elongated inserting areas (E1 and E2).

On the other hand, when determining that there is not any vertically elongated inserting area, the CPU 20 advances the procedure to step S46, to be described later.

Step S42: The CPU 20 selects one horizontally elongated inserting area and fits the inserting images included in the group selected in step S34 into the inserting area.

The CPU 20 selects one horizontally elongated inserting area and fits the inserting images in the group selected in step S34, which are arranged in the combination of layouts selected in step S36, into the inserting area. Then, the CPU 20 changes the fitting position and finds a position in which the magnification is the maximum.

Step S43: The CPU 20 calculates the magnification when the inserting images are fit into the position found in step S42.

Step S44: The CPU 20 records the magnification calculated in step S44 after associating it with the inserting area selected in step S42.

Step S45: The CPU 20 determines whether or not there is another horizontally elongated inserting area. Then, when determining that there is another horizontally elongated inserting area, the CPU 20 returns the procedure to step S42. That is, the CPU 20 performs the same processing for all of the horizontally elongated inserting areas.

On the other hand, when determining that there is not any horizontally elongated inserting area, the CPU 20 advances the procedure to step S46.

Step S46: The CPU 20 determines whether or not there is another layout combination of the inserting images included in the group selected in step S34. Then, when determining that there is another layout combination, the CPU 20 returns the procedure to step S36. Then, in step S36, the CPU 20 selects a layout combination different from the previous one.

Figure 23B:
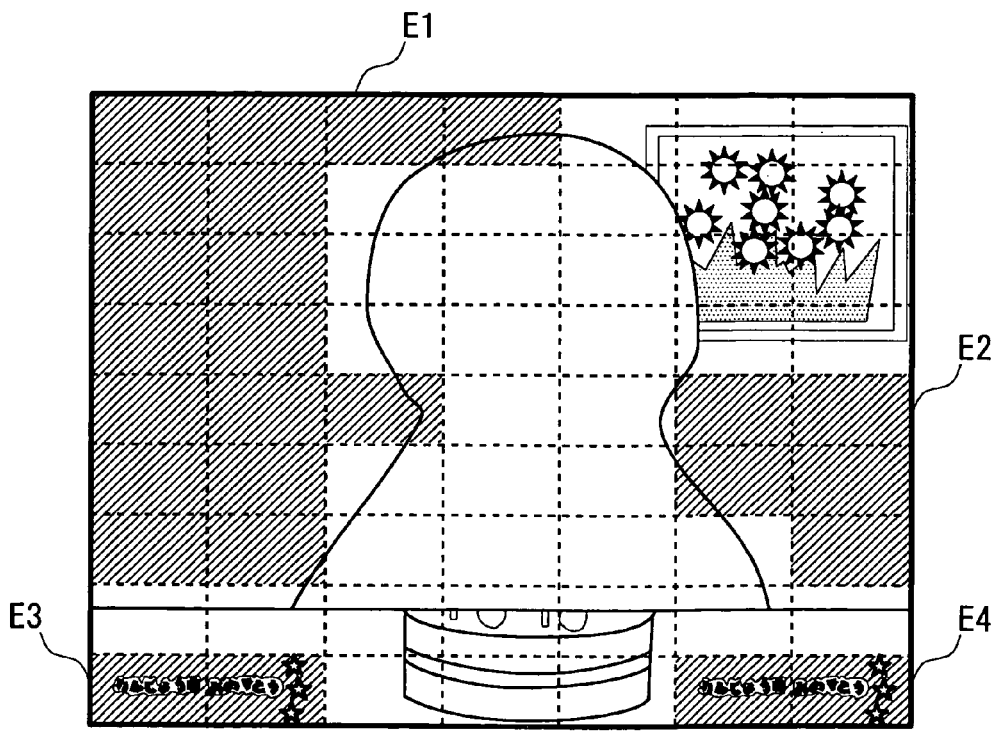
FIG. 23B is a diagram for illustrating determination of an inserting area.

FIG. 23B shows an example, in which the inserting images in the second group (group selected in step S34) are arranged in the horizontal direction as shown in FIG. 21B (arranged in the combination of layouts selected in step S36) and fit into the horizontally elongated inserting areas (E3 and E4).

On the other hand, when determining that there is not any layout combination, the CPU 20 advances the procedure to step S47.

Step S47: The CPU 20 selects an inserting area with the maximum magnification calculated. Here, as is obvious from FIG. 23A and FIG. 23B, the magnification in the inserting area E1 is the maximum among the four inserting areas E1 to E4. Consequently, the inserting area E1 is selected.

Step S48: The CPU 20 determines whether or not the size of the inserting images when the inserting images in the group selected in step S34 are resized with the maximum magnification based on the selection in step S47 is larger than or equal to a threshold value. The threshold value is based on, for example, the empirically-found size of an inserting image that can be recognized visually when a composite image is printed in a predetermined size (for example, "L size"). Specifically, it is possible to find the threshold value by converting the size of the above-described inserting-images that can be recognized visually in accordance with the number of pixels of the image sensor 13.

Then, when determining that the size is larger than or equal to the threshold value, the CPU 20 advances the procedure to step S49. On the other hand, when determining that the size is less than the threshold value, the CPU 20 advances the procedure to step S61, to be described later.

Step S49: The CPU 20 determines the inserting area selected in step S47 as the inserting area of the inserting images in the group selected in step S34. Then, the CPU 20 records the information indicative of the determined inserting area and information indicative of the magnification after associating them with the inserting images in the group selected in step S34.

Figure 24A:
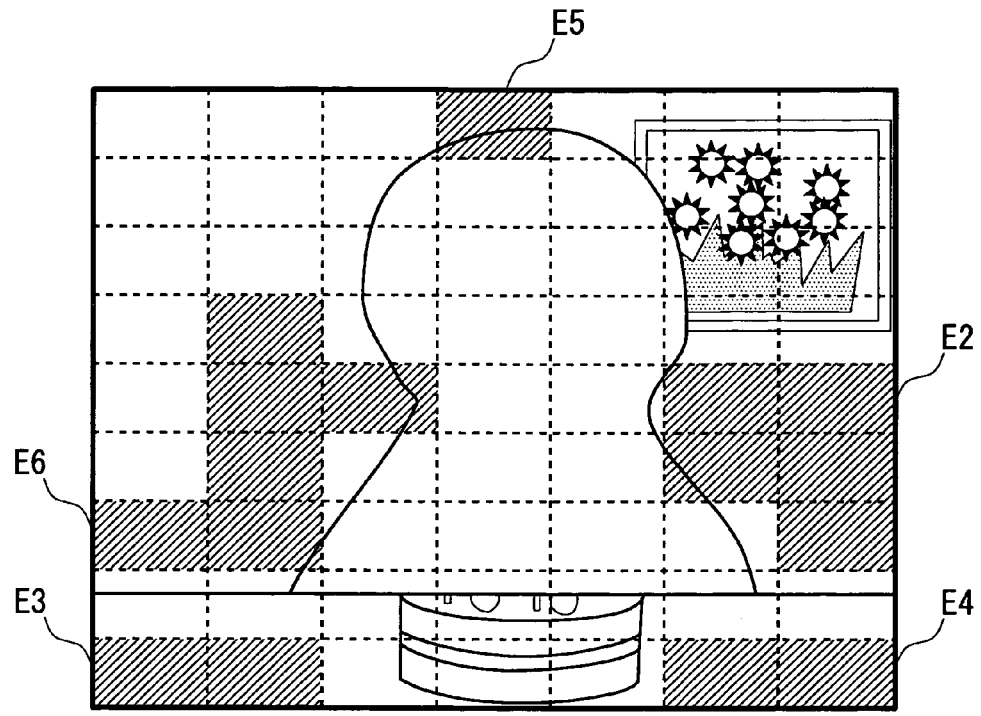
FIG. 24A is another diagram for illustrating determination of an inserting area.

Step S50: The CPU 20 excludes the inserting area determined in step S49 from the candidates in the subsequent processing. Here, the inserting area E1 shown in FIG. 23A is determined as the inserting area into which the inserting images are inserted, and therefore, the part into which the inserting images are inserted is excluded from the inserting area E1. As a result, as shown in FIG. 24A, an inserting area E5 and an inserting area E6 are regarded as candidates in the subsequent processing, instead of the inserting area E1. The inserting area E2 to the inserting area E4 are not determined as the inserting area into which the inserting images are inserted, and therefore, they still remain candidates in the subsequent processing.

Step S51: The CPU 20 determines whether or not inserting areas have been determined for all of the groups. Then, when determining that inserting areas have been determined for all of the groups, the CPU 20 ends a series of processing to determine an inserting area of an inserting image. On the other hand, when determining that inserting areas have not been determined for all of the groups, the CPU 20 returns the procedure to step S34 and then selects a group with second highest priority.

Step S52 to step S60: The CPU 20 performs the same processing as that in step S37 to step S45 for an inserting image that has not been subjected to the association processing yet. Then, when determining "No" in step S56 or step S60, the CPU 20 advances the procedure to step S47 described above.

Figure 24B:
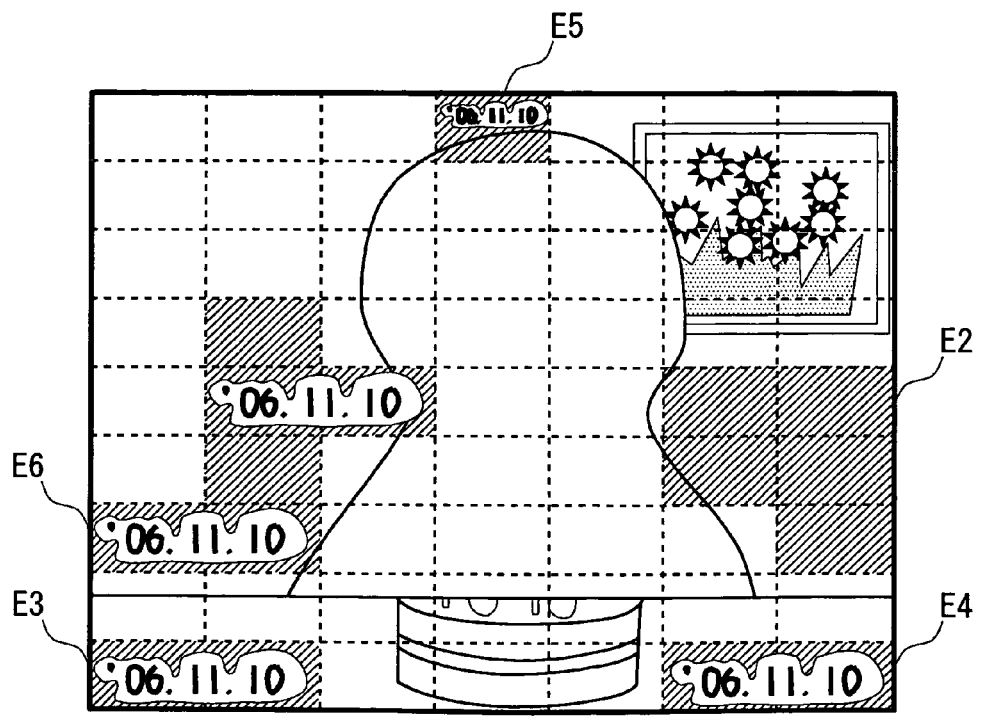
FIG. 24B is another diagram for illustrating determination of an inserting area.

FIG. 24B is an example when the inserting image in the first group (group selected in step S34) is fitted into the horizontally elongated inserting areas (E3, E4, E5, and E6). Here, as shown in FIG. 24B, the magnification in the inserting area E3, the inserting area E4, and the inserting area E6 is the maximum. When there is a plurality of inserting areas having substantially the same magnification as described above, it may also be possible to select with priority the inserting area the position of which is near to the main subject detected in step S2. In the example in FIG. 24B, it may also be possible to select the inserting area E6 that is in the position nearest to the main subject. However, as shown in FIG. 24B, when the magnification is substantially the same in a plurality of positions within one area, any one may be selected appropriately. In the example of E6 in FIG. 24B, the position in the upper right has a probability that it overlaps the main subject area, and therefore, it is recommended to select the position in the lower left. Alternatively, it may also be possible to select with priority a position nearer to the position input first.

Step S61: The CPU 20 newly selects an inserting area from the overall background area detected in step S3 in place of the inserting area selected in step S5. By selecting an inserting area from the overall background area despite the successive blocks described in step S5 in this manner, it is possible to select an inserting area having an area larger than that in step S5. Here, the diagonally-shaded area is selected as an inserting area in FIG. 14.

In addition, it may also be possible to newly select an inserting area under less severe conditions than those when the inserting area is selected in step S5, instead of newly selecting an inserting area from the overall background area in step S61.

Step S62 to step S73: The CPU 20 performs the same processing as that in step S35 to step S46. Then, the CPU 20 determines whether or not there is another layout combination of the inserting images included in the group selected in step S34 in step S73. Then, when determining that there is another layout combination, the CPU 20 returns the procedure to step S63. Then, the CPU 20 selects a layout combination different from the previous one in step S63.

On the other hand, when determining that there is not any layout combination, the CPU 20 advances the procedure to step S83, to be described later.

Step S74 to step S82: The CPU 20 performs the same processing as that in step S37 to step S45. Then, when determining "No" in step S78 or step S82, the CPU 20 advances the procedure to step S83, to be described later.

Step S83: The CPU 20 selects the inserting area with the maximum magnification calculated as in step S47. Because the inserting area is selected from the overall background area in step S61, it is possible to expect in step S83 a larger magnification compared to that in step S47.

Step S84: The CPU 20 determines whether or not the size of the inserting image when the inserting image of the group selected in step S34 is resized with the maximum magnification is larger than or equal to the threshold value based on the selection in step S83.

Then, when determining that the size is larger than or equal to the threshold value, the CPU 20 advances the procedure to step S86, to be described later. On the other hand, when determining that the size is less than the threshold value, the CPU 20 advances the procedure to step S85.

Step S85: The CPU 20 determines a magnification again based on the selection in step S83 so that the size of the inserting image when resizing the inserting image of the group selected in step S34 substantially coincides with the threshold value described in step S84. As a result, it is possible to realize the size of the inserting image that can be recognized visually when the composite image is printed in a predetermined size. However, it is recommended to notify the user by displaying error message etc. on the image displaying part 2 when the inserting image overlaps the main subject area as a result of that priority is given to magnification.

When the size of the inserting image when resizing the inserting image of the group selected in step S34 is less than the threshold value described in step S84, it may also be possible to adopt the magnification based on the selection in step S83 without the need to determine a magnification again in step S85. In this case, it is possible to avoid the inserting image from overlapping the main subject area. However, it is recommended to notify the user that the size of the inserting image is less than the threshold value by displaying error message etc. on the image displaying part 2.

Step S86: The CPU 20 determines the inserting area selected in step S83 as the inserting area of the inserting image of the group selected in step S34 as in step S49. Then, the CPU 20 records the information indicative of the determined inserting area and the magnification after associating them with the inserting image of the group selected in step S34. Then, the CPU 20 advances the procedure to step S50 described above.

Figure 12:
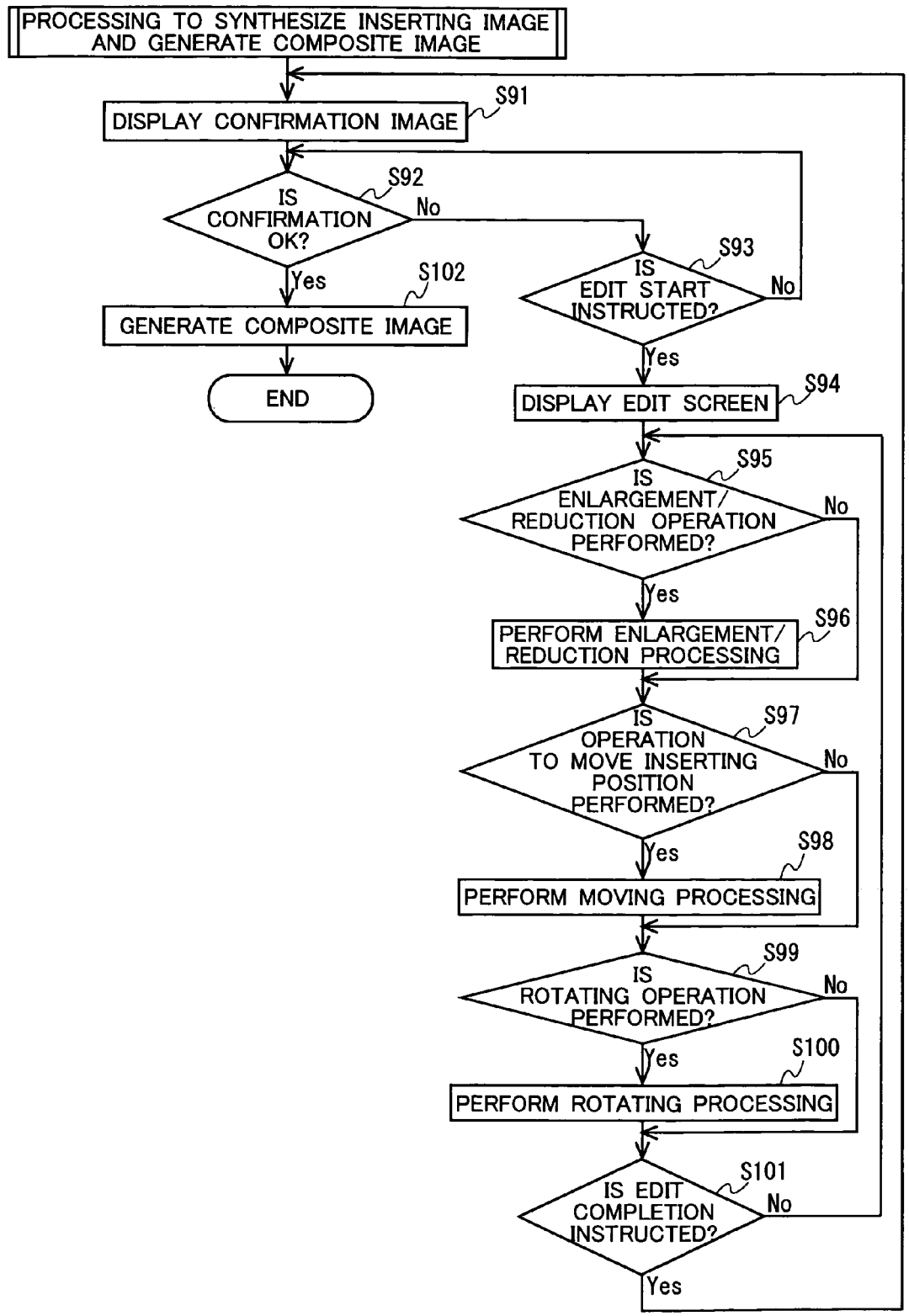
FIG. 12 is another flowchart showing the operation of the electronic camera 1 in the first embodiment.

Next, the operation of the CPU 20 when synthesizing the inserting image and generating the composite image, described in step S7 of the flowchart in FIG. 3, will be described using the flowchart in FIG. 12.

Step S91: The CPU 20 controls the display controlling part 19 to display a confirmation image on the image displaying part 2. The CPU 20 enlarges or reduces the inserting image to a magnification determined by the above-described series of processing on the image displaying part 2 and inserts it into the inserting area of the image of the image data into which the inserting image is inserted. Then, the CPU 20 displays the image generated by the insertion processing on the image displaying part 2. Further, the CPU 20 displays the "OK" button and the "Edit" button similar to those in FIG. 18 on the image displaying part 2.

Step S92: The CPU 20 determines whether or not "confirmation OK" is instructed. Then, the CPU 20 advances the procedure to step S102, to be described later, when "confirmation OK" is instructed. On the other hand, when determining that "confirmation OK" is not instructed, the CPU 20 advances the procedure to step S93. That "confirmation OK" is instructed by the user means that the user is satisfied with the image including the inserting image displayed in step S91. The instruction of "confirmation OK" is given by the user selecting the "OK" button described in step S94.

Step S93: The CPU 20 determines whether or not "edit start" is instructed as in step S17. Then, when "edit start" is instructed, the CPU 20 advances the procedure to step S94. On the other hand, when determining that "edit start" is not instructed, the CPU 20 returns the procedure to step S92. The instruction of "edit start" is given by the user selecting the "Edit" button described in step S91.

Step S94: The CPU 20 controls the display controlling part 19 to display an edit screen on the image displaying part 2.

The edit screen is a screen capable of receiving the operation to enlarge/reduce an inserting image, the operation to move the position where the inserting image is inserted, and the operation to rotate the inserting image based on the confirmation image described in step S91. Such an edit screen is the same as that of the publicly-known technique, and therefore, its description is omitted. On the edit screen, the "OK" button is displayed.

Step S95: The CPU 20 determines whether or not the user has performed the enlargement/reduction operation using the touch panel 21. Then, the CPU 20 advances the procedure to step S96 when the user has performed the enlargement/reduction operation. On the other hand, when determining that the user has not performed the enlargement/reduction operation, the CPU 20 advances the procedure to step S97, to be described later. The enlargement/reduction operation is performed in a manner similar to that of the publicly-known technique.

Step S96: The CPU 20 performs processing to enlarge/reduce the corresponding inserting image based on the enlargement/reduction operation performed in step S95.

Step S97: The CPU 20 determines whether or not the user has performed the operation to move the inserting position using the touch panel 21. Then, the CPU 20 advances the procedure to step S98 when the user has performed the operation to move the inserting position. On the other hand, when determining that the user has not performed the operation to move the inserting position, the CPU 20 advances the procedure to step S99, to be described later. The operation to move the inserting position is performed in a manner similar to that of the publicly-known technique.

Step S98: The CPU 20 performs processing to move the inserting position of the corresponding inserting image based on the moving operation of the inserting position performed in step S97.

Step S99: The CPU 20 determines whether or not the user has performed the rotation operation using the touch panel 21. Then, the CPU 20 advances the procedure to step S100 when the user has performed the rotation operation. On the other hand, when determining that the user has not performed the rotation operation, the CPU 20 advances the procedure to step S101, to be described later. The rotation operation is performed in a manner similar to that of the publicly-known technique.

Step S100: The CPU 20 performs rotation processing of the corresponding inserting image based on the rotation operation performed in step S99.

Step S101: The CPU 20 determines whether or not "edit completion" is instructed as in step S25. Then, when "edit completion" is instructed, the CPU 20 returns the procedure to step S91 and displays the confirmation image again. On the other hand, when determining that "edit completion" is not instructed after a lapse of a fixed period of time, the CPU 20 returns the procedure to step S95. The instruction of "edit completion" is given by the user selecting the "OK" button described in step S94.

Step S102: The CPU 20 generates a composite image. The CPU 20 controls the image processing part 14 and resizes the inserting image determined in step S4 to the magnification at the time of "confirmation OK" in step S92. When there is a plurality of inserting images, the CPU 20 resizes each of the plurality of inserting images. Then, for the image data temporarily recorded in the memory 15 (image data of the image determined in step S1), the CPU 20 inserts the resized image into the inserting area at the time of "confirmation OK" in step S92 and generates a composite image. When there is a plurality of inserting images, the CPU 20 inserts the plurality of inserting images into the respective inserting areas and generates a composite image.

Figure 25:
FIG. 25 is a diagram showing an example of a generated composite image.

FIG. 25 shows an example of a composite image generated.

Then, the CPU 20 controls the recording part 16 to record the image data of the composite image generated and ends the series of processing to generate a composite image.

As described above, according to the first embodiment, the camera includes the imaging unit that captures a subject images and generates image data, the inserting-image setting unit that sets an inserting image that is inserted into the image of the image data, the first detecting unit that detects a main subject area in the subject, the second detecting unit that detects the background area in the subject based on the main subject area, the inserting-area selecting unit that selects an inserting area into which the inserting image is inserted from the background area, and the magnification determining unit that determines a magnification for enlargement or reduction of the inserting image in accordance with the size of the inserting area and the size of the inserting image. Consequently, it is possible to determine an appropriate magnification in accordance with size and shape of the inserting image and the inserting area into which the inserting image is inserted.

Further, according to the first embodiment, the camera further includes the size changing unit that enlarges or reduces the inserting image according to the magnification determined by the magnification determining unit and the inserting unit that inserts the inserting image enlarged or reduced by the size changing unit into the inserting area. Consequently, it is possible to insert an inserting image of an appropriate size according to the size of the inserting image and the inserting area into which the inserting image is inserted.

Further, according to the first embodiment, the camera further includes the recording unit that records the image data generated by the imaging unit, the image data of the inserting image, the information indicative of the inserting area, and the magnification determined by the magnification determining unit in associating with one another in the recording medium. Consequently, it is possible to insert an inserting image into an appropriate position with a desired timing after shooting.

Further, according to the first embodiment, the camera further includes the displaying unit of touch panel type and the inserting-image setting unit includes an obtaining unit that obtains handwritten information based on the user operation via the displaying unit or text information obtained by performing character recognition processing on the handwritten information as an inserting image. Consequently, it is possible to insert various inserting images. Further, as to handwritten information, it is made easy to input characters etc. by making it possible to input using the overall display screen of the displaying unit. It is also possible to input easy-to-recognize characters etc. when the sensitivity of the touch panel of the displaying unit is low. Further, it is also possible to expect handwritten information input in large size to be less conspicuous by reducing and then inserting the handwritten information.

In the first embodiment, the example in which an inserting image is inserted at the time of imaging and the example in which an inserting image is inserted into an image read from the recording unit are described. However, it may also be possible to set up a configuration in which an inserting area into which an inserting image is inserted is determined in advance at the time of imaging and then the insertion of the inserting image is performed according to the user instruction at the time of reproduction.

Figure 26:
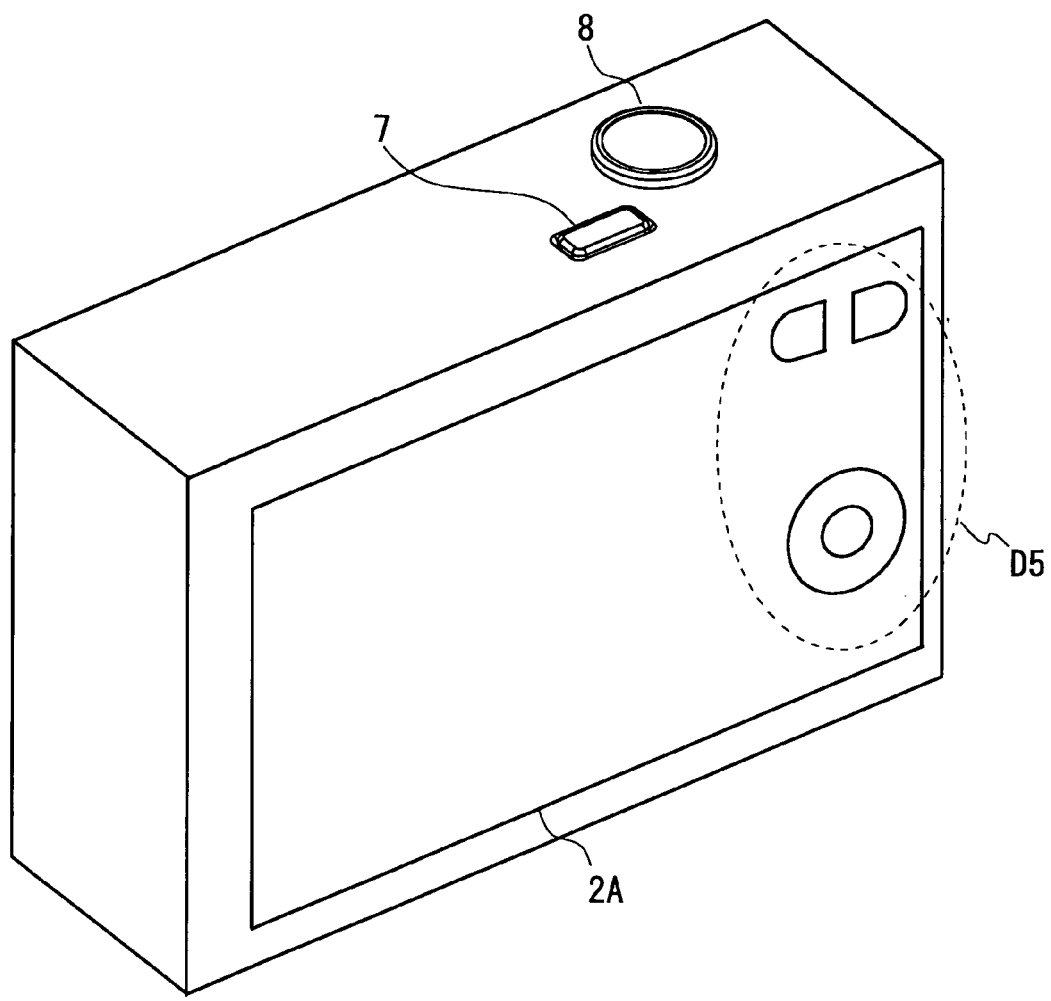
FIG. 26 is a modification example of the electronic camera 1 in the first embodiment.

In the first embodiment, the example is shown, in which the touch panel 21 is provided, however, a configuration may be such that an operating member, which is not of touch panel type, is provided. It is possible for the user to input characters etc. by operating the operating member. Further, as shown in FIG. 26, it may also be possible to include an image displaying part 2A on the overall rear surface. In this case, as shown in FIG. 26, in a display area D5 of the image displaying part 2A, icons that can be operated by the touch panel 21, corresponding to the zoom buttons 3L and 3R and the cross button 4 described in the first embodiment are displayed. Then, when inputting an inserting image of handwritten information, it is recommended to input using the overall image displaying part 2A including the display area D5 on which icons are displayed.

In the first embodiment, the example is shown, in which both the color distribution and the luminance distribution are used as factors when selecting an inserting area from the background area (refer to step S5), however, it may also be possible to use only one of them. Further, it may also be possible to set up a configuration in which a range of the color signal and the luminance value is determined in advance and a block having the color signal and luminance value within the range is selected. Furthermore, it may also be possible to set up a configuration in which when two successive blocks are detected, which satisfy the conditions concerning the difference in the central value of the color distribution and the difference in the central value of the luminance distribution, a block is selected, which has the color signal and luminance value the same as the color signal and luminance value of the blocks.

In the first embodiment, it may also be possible to set up a configuration in which the rotation operation to rotate an inserting image is received at the time of editing the processing to determine the inserting image (refer to FIG. 4 to FIG. 5) (step S17 to step S25). Further, it may also be possible to set up a configuration in which an inserting image is rotated and then fitted when inserting the inserting image into an inserting area (step S38, step S42, etc.) in the processing to determine the inserting area of the inserting image (refer to FIG. 6 to FIG. 11). Furthermore, it may also be possible to set up a configuration in which inserting images are arranged in an oblique direction when selecting a combination of layouts of the inserting images included in the group (step S36, step S63) in the processing to determine an inserting area of the inserting image (refer to FIG. 6 to FIG. 11).

Second Embodiment

Hereinafter, a second embodiment will be described using the drawings. In the second embodiment, a computer is taken as an example for description.

Figure 27:
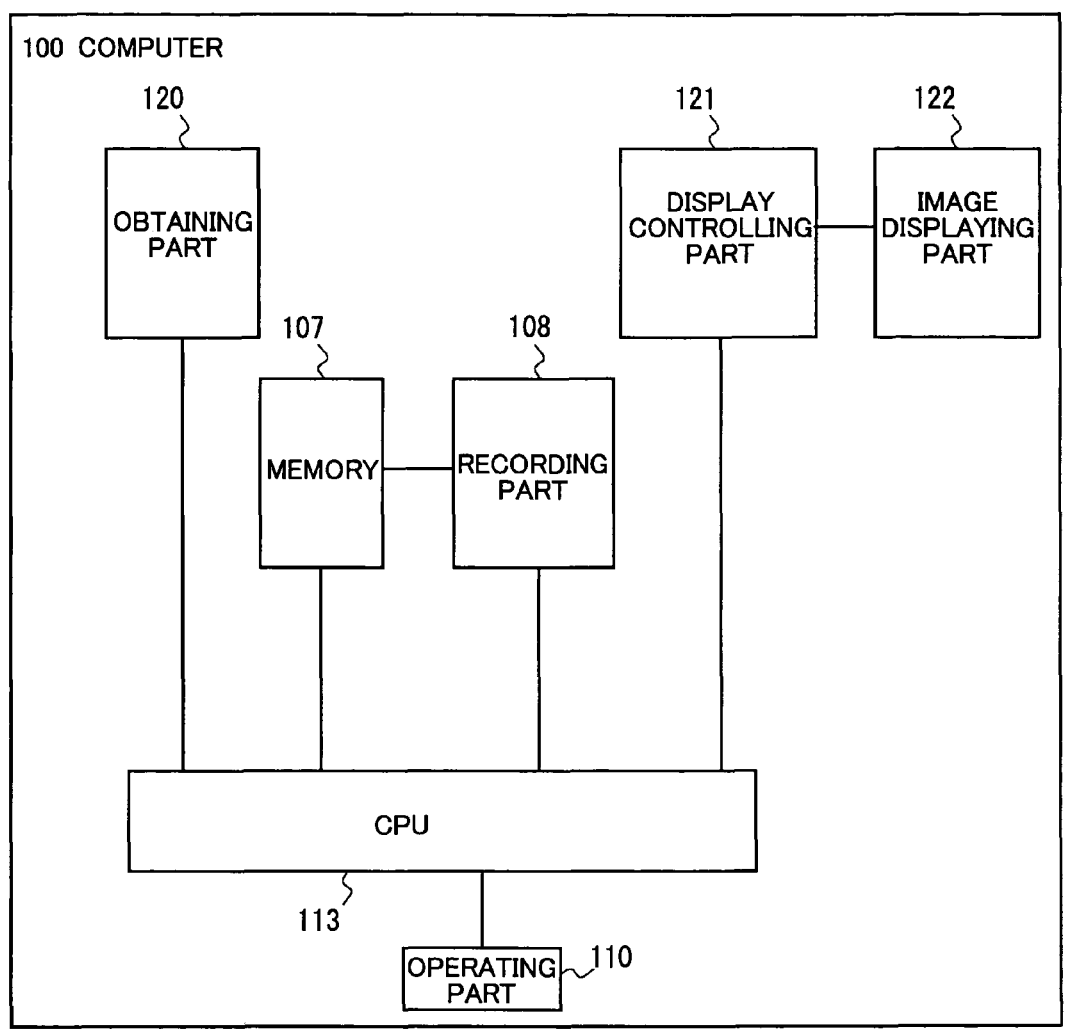
FIG. 27 is a diagram showing a configuration of a computer 100 in a second embodiment.

FIG. 27 is a diagram showing a configuration of a computer 100 in the second embodiment. The computer 100 includes, as shown in FIG. 27, a memory 107, a recording part 108, an operating part 110, a CPU 113, an obtaining part 120, a display controlling part 121, and an image displaying part 122. The memory 107 temporarily records image data etc. obtained by the obtaining part 120. The recording part 108 records the image data etc. temporarily recorded in the memory 107. The operating part 110 includes a power button, mouse, keyboard, etc. The CPU 113 controls each part integrally. Further, the CPU 113 determines an inserting area of an inserting image. Details of the determination will be described later. In addition, the CPU 113 records in advance programs to execute each processing. The obtaining part 120 obtains image data from an external device, such as an electron camera, and a recording medium via a wired or wireless recording medium drive etc. The display controlling part 121 controls the display of an image to the image displaying part 122. The image displaying part 122 includes an image display element, such as a liquid crystal display element.

Figure 28:
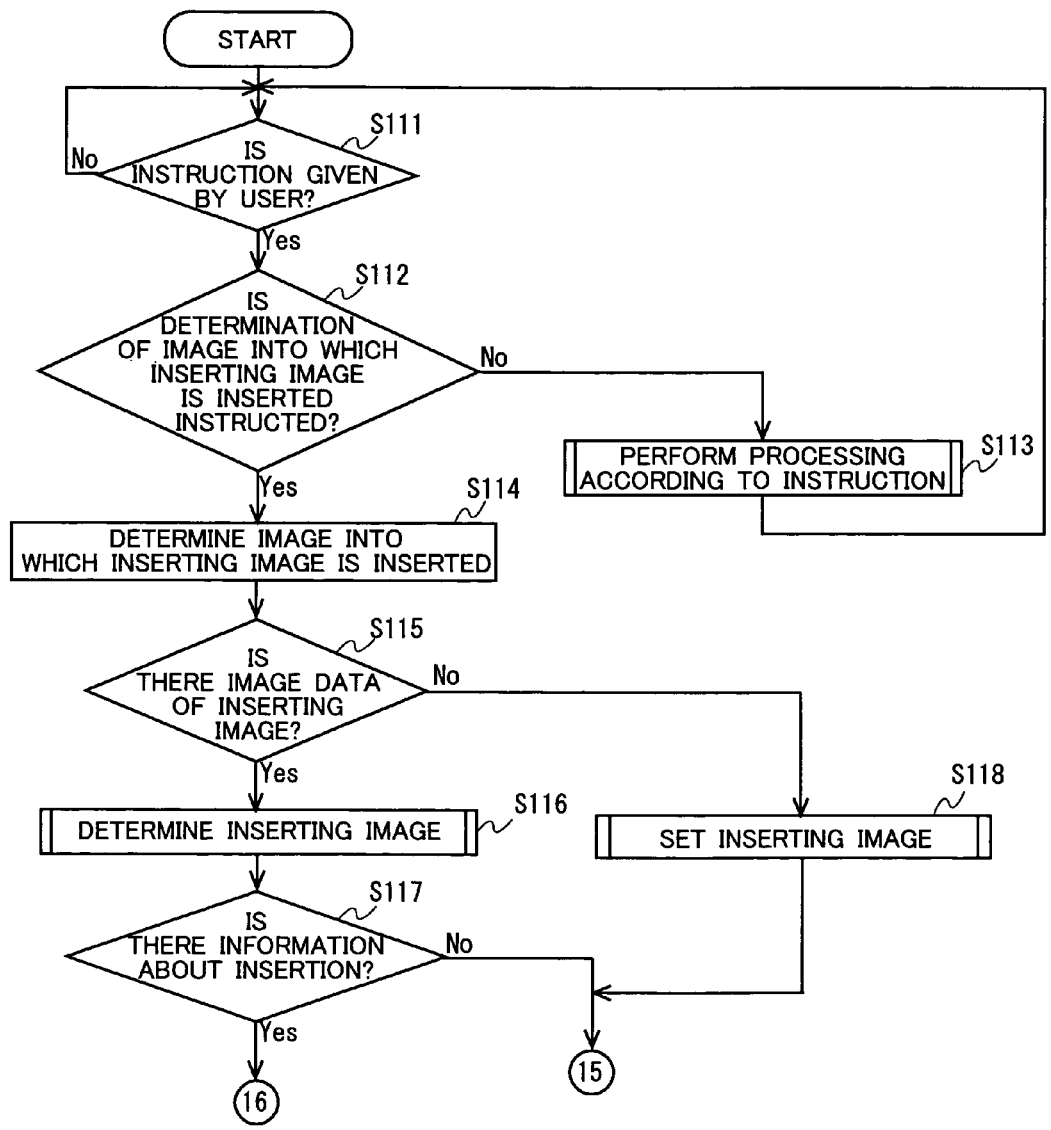
FIG. 28 is a flowchart showing an operation of the computer 100 in the second embodiment.
Figure 29:
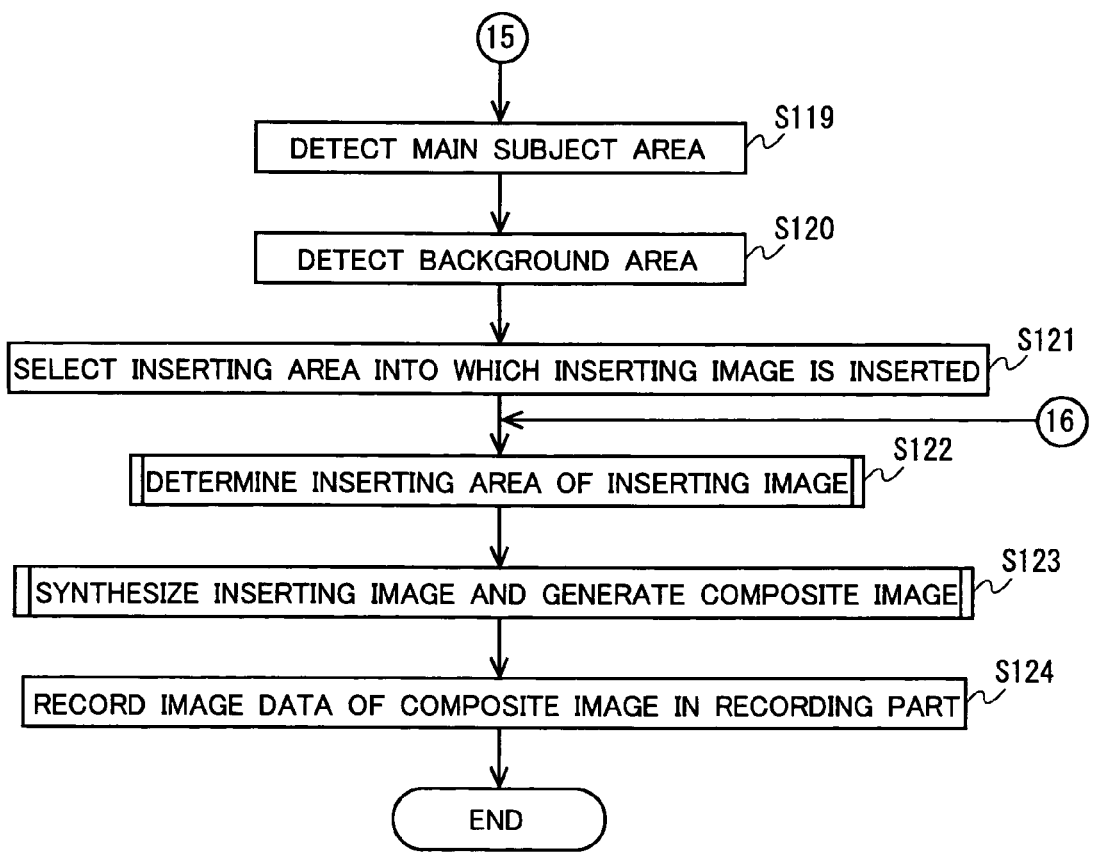
FIG. 29 is another flowchart showing the operation of the computer 100 in the second embodiment.

Next, the operation of the CPU 113 in the computer 100 will be described using the flowcharts in FIG. 28 and FIG. 29.

Step S111: The CPU 113 determines whether or not an instruction is given by a user. Then, when determining that an instruction is given by a user, the CPU 113 advances the procedure to step S112.

Step S112: The CPU 113 determines whether or not an instruction to determine an image into which an inserting image is inserted is given. Then, when determining that an instruction to determine an image is given, the CPU 113 advances the procedure to step S114, to be described later. On the other hand, when an instruction other than that to determine an image is given, the CPU 113 advances the procedure to step S113.

Step S113: The CPU 113 performs processing according to the instruction. The specific processing method is the same as that in the publicly-known technique, and therefore, its description is omitted. After performing processing in accordance with the instruction, the CPU 113 returns the procedure to step S111.

Step S114: The CPU 113 determines a target image into which an inserting image is inserted. The CPU 113 obtains image data of the target image from an external device or the recording medium by controlling the obtaining part 120. Alternatively, the CPU 113 reads image data of the target image from the recording part 108. Then, the CPU 113 temporarily records image data of the determined image in the memory 107. Some images have tag information. In the present embodiment, tag information includes image data of an inserting image, information about insertion, etc. The image data of an inserting image includes image data of an inserting image of handwritten information similar to that in the first embodiment, an inserting image by character recognition processing, an inserting image of stamp information, and so on. The information about insertion includes positional information of an inserting area described in the first embodiment, information about a main subject area, information about a background area, and so on.

Step S115: The CPU 113 determines whether or not there is image data of an inserting image in the tag information. When determining that there is image data of an inserting image in the tag information, the CPU 113 advances the procedure to step S116. On the other hand, when determining that there is not image data of an inserting image, the CPU 113 advances the procedure to step S118, to be described later.

Step S116: The CPU 113 determines an inserting image. For example, the CPU 113 determines an inserting image by performing the same processing as that in step S15 to step S25 in the flowcharts in FIG. 4 and FIG. 5.

Step S117: The CPU 113 determines whether or not there is information about insertion in the tag information. Then, when determining that there is information about insertion in the tag information, the CPU 113 advances the procedure to step S122, to be described later. On the other hand, when determining that there is not information about insertion in the tag information, the CPU 113 advances the procedure to step S119, to be described later.

Step S118: The CPU 113 determines an inserting image. For example, the CPU 113 determines an inserting image by performing the same processing as that in step S11 to S25 in the flowcharts in FIG. 4 and FIG. 5.

Step S119: The CPU 113 detects a main subject area in the image determined in step S114. For example, the CPU 113 detects a main subject area by performing the same processing as that in step S2 in the flowchart in FIG. 3.

Step S120: The CPU 113 detects a background area based on the main subject area detected in step S119. For example, the CPU 113 detects a background area by performing the same processing as that in step S3 in the flowchart in FIG. 3.

Step S121: The CPU 113 selects a candidate of an inserting area into which the inserting image determined in step S116 or step S118 is inserted. For example, the CPU 113 selects an inserting-area candidate by performing the same processing as that in step S5 in the flowchart in FIG. 3.

Step S122: The CPU 113 determines an inserting area into which the inserting image determined in step S116 or step S118 is inserted. For example, the CPU 113 determines an inserting area into which an inserting image is inserted by performing the same processing as that in step S31 to step S86 in the flowcharts in FIG. 6 to FIG. 11. When determining that there is information about insertion in the tag information in step S117, the CPU 113 appropriately determines an inserting area into which an inserting image is inserted in accordance with information included in the information about insertion.

Step S123: The CPU 113 synthesizes the inserting image determined in step S116 or step S118 to the image determined in step S114 and thus generates a composite image. For example, the CPU 113 generates a composite image by performing the same processing as that in step S91 to step S102 in the flowchart in FIG. 12.

Step S124: The CPU 113 controls each part and records image data of the composite image temporarily recorded in the memory 107 in the recording part 108. As described above, according to the second embodiment, it is possible to obtain the same effects as those in the first embodiment by means of the image processing programs to realize image processing for the image data to be processed by a computer.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be restored to, falling within the scope thereof.

What is claimed is:

1. A camera comprising:
an imaging unit that captures a subject image to generate image data; an inserting-image setting unit that sets an inserting image to be inserted into an image of the image data;
a first detecting unit that detects a main subject area in the subject image;
a second detecting unit that detects a background area in the subject image based on the main subject area;
an inserting-area selecting unit that selects an inserting area into which the inserting image is inserted from the background area;
a magnification determining unit that determines a magnification for enlargement or reduction of the inserting image in accordance with a size of the inserting area and a size of the inserting image;
a priorities decision unit that sets, when there is a plurality of inserting images to be set by the inserting-image setting unit, priorities to the plurality of the inserting images, wherein
the inserting-area selecting unit selects a plurality of inserting areas into which the plurality of the inserting images are inserted respectively in a descending order of priorities; and
the magnification determining unit determines each magnification in accordance with each size of the plurality of the inserting areas selected by the inserting-area selecting unit and each size of the plurality of the inserting images to be inserted into the plurality of the inserting areas respectively in the descending order of priorities.

2. The camera according to claim 1, further comprising:
a size changing unit that enlarges or reduces the inserting image in accordance with the magnification determined by the magnification determining unit; and
an inserting unit that inserts the inserting image enlarged or reduced by the size changing unit into the inserting area.

3. The camera according to claim 1, further comprising
a recording unit that records the image data generated by the imaging unit, image data of the inserting image, information indicative of the inserting area, and the magnification determined by the magnification determining unit in association with one another into a recording medium.

4. The camera according to claim 1, further comprising
a displaying unit of touch panel type, wherein
the inserting-image setting unit includes an obtaining unit that obtains handwritten image information based on a user operation via one of the displaying unit and text information obtained by performing character recognition processing on the handwritten image information as the inserting image.

5. The camera according to claim 4, wherein
the inserting-image setting unit includes an extracting unit that extracts an area of the inserting image obtained by the obtaining unit.

6. The camera according to claim 5, further comprising:
a display controlling unit that displays a confirmation image for confirming the area of the inserting image extracted by the extracting unit on the displaying unit; and
a receiving unit for changing of area that receives a user instruction to couple or cut the area of the inserting image, wherein
the inserting-image setting unit sets the inserting image based on the user instruction received by the receiving unit for changing of area.

7. The camera according to claim 5, further comprising:
a display controlling unit that displays a confirmation image for confirming the area of the inserting image extracted by the extracting unit on the displaying unit; and
a receiving unit for associating area that receives, when the inserting image includes a plurality of areas, a user instruction to associate at least two areas among the plurality of the areas, wherein
the inserting-image setting unit sets the inserting image based on the user instruction received by the receiving unit for associating area.

8. The camera according to claim 7, wherein
the inserting-image setting unit includes
a determining unit that determines, when character information is included in a plurality of areas associated with one another by a user instruction, whether the character information is written vertically or horizontally, and
a layout setting unit that sets a layout of the plurality of the areas in accordance with a determination result by the determining unit.

9. The camera according to claim 1, wherein
the priorities decision unit sets the priorities based on at least one of each size of the plurality of the inserting images, an input order of the plurality of the inserting images by a user, and an instruction of a priority order by a user.

10. The camera according to claim 1, further comprising
an inserting-area setting unit, wherein
when there is a plurality of inserting-area candidates which are candidates of the inserting area,
the magnification determining unit determines each magnification for enlargement or reduction of the inserting image for each of the plurality of the inserting-area candidates, and the inserting-area setting unit sets an inserting-area candidate which corresponds to a highest magnification determined by the magnification determining unit from among the plurality of the inserting-area candidates, as an inserting area into which the inserting image is inserted.

11. The camera according to claim 10, wherein
the inserting-area selecting unit determines whether or not there is a plurality of the inserting-area candidates and selects inserting-area candidates which meet specific conditions as second inserting-area candidates based on shapes of the plurality of the inserting-area candidates when determining that there is the plurality of the inserting-area candidates, and wherein
the magnification determining unit determines each magnification for enlargement or reduction of the inserting image for each of the second inserting-area candidates.

12. The camera according to claim 10, wherein
the inserting-area setting unit sets the inserting area by taking into consideration whether or not the size of the inserting image being enlarged or reduced is less than a threshold value.

13. The camera according to claim 10, wherein
the inserting-area selecting unit divides the background area into a plurality of blocks and determines whether a plurality of areas each including successive blocks in which a difference in color distribution and a difference in luminance distribution are each within a predetermined threshold value exist or not, and selects a plurality of the successive blocks as the plurality of the inserting-area candidates when determining that the plurality of the areas exist.

14. The camera according to claim 13, wherein
the inserting-area selecting unit selects the inserting area from all of the background area regardless of the successive blocks when the size of the inserting image being enlarged or reduced is less than a threshold value in all of the plurality of the inserting-area candidates.

15. The camera according to claim 1, wherein
the first detecting unit detects the main subject area based on at least one of a face recognition technique and information about an AF area.

16. The camera according to claim 1, wherein
the inserting-area selecting unit divides the background area into a plurality of blocks and selects, as the inserting area, an area including successive blocks in which a difference in color distribution and a difference in luminance distribution are each within a threshold value.

17. The camera according to claim 2, further comprising:
a displaying unit that displays a confirmation image for confirming an insertion result of the inserting image inserted by the inserting unit; and
a receiving unit for editing of inserting-image that receives at least one of a user instruction to change a position of the inserting image, a user instruction to change a magnification for enlargement or reduction by the size changing unit, and a user instruction to rotate the inserting image.

* * * * *